US012766788B2

(12) United States Patent
Ali et al.

(10) Patent No.: US 12,766,788 B2
(45) Date of Patent: Oct. 20, 2026

(54) 3D PRINTING AUTOMATION ASSISTED BY INTEGRATED ROBOTIC SYSTEM

(71) Applicant: Zylo3D Inc., Wilmington, DE (US)

(72) Inventors: Ahmed Magdy Mohmed Yamany Ali, Cairo (EG); Mohamed Yehia Mohamed Mohamed, Cairo (EG); Ahmed Moustafa Negmeldin Mohamed, Cairo (EG); Abdelrahman Ashraf Mohamed Qadry, Beheira (EG); Ahmed Adel Mohamed Abdelsallam, Cairo (EG); Alaa Fathy, Cairo (EG); Diaa Abdel Maged Khalil, Cairo (EG); Kareem Ibrahim El-Seherawy, Cairo (EG)

(73) Assignee: Zylo3D Inc., Wilmington, DE (US)

( * ) Notice: Subject to any disclaimer, the term of this patent is extended or adjusted under 35 U.S.C. 154(b) by 41 days.

(21) Appl. No.: 18/793,590

(22) Filed: Aug. 2, 2024

(65) Prior Publication Data

US 2025/0042086 A1 Feb. 6, 2025

Related U.S. Application Data

(60) Provisional application No. 63/517,504, filed on Aug. 3, 2023.

(51) Int. Cl.

| | |
|---|---|
| ***B29C 64/232*** | (2017.01) |
| ***B29C 64/135*** | (2017.01) |
| ***B29C 64/205*** | (2017.01) |
| ***B29C 64/236*** | (2017.01) |
| ***B29C 64/245*** | (2017.01) |

(Continued)

(52) U.S. Cl.

CPC .......... *B29C 64/232* (2017.08); *B29C 64/135* (2017.08); *B29C 64/205* (2017.08); *B29C 64/236* (2017.08); *B29C 64/245* (2017.08); *B29C 64/268* (2017.08); *B29C 64/30* (2017.08);

(Continued)

(58) Field of Classification Search

None

See application file for complete search history.

(56) References Cited

U.S. PATENT DOCUMENTS

| | | | | |
|---|---|---|---|---|
| 2007/0074659 | A1 * | 4/2007 | Wahlstrom ............. | B33Y 40/00 118/712 |
| 2020/0055233 | A1 * | 2/2020 | Cullen .................. | G03F 7/0037 |

(Continued)

FOREIGN PATENT DOCUMENTS

| | | | | |
|---|---|---|---|---|
| EP | 4173802 A1 * | 5/2023 | ........... | B29C 64/245 |

OTHER PUBLICATIONS

PCT/US2024/040879. International Search Report & Written Opinion (Oct. 18, 2024).

*Primary Examiner* — Yung-Sheng M Tsui

(74) *Attorney, Agent, or Firm* — Loza & Loza, LLP; Holly L. Rudnick

(57) ABSTRACT

Aspects relate to a three-dimensional (3D) printing device including a gantry system configured to move a build platform between the different stages of the printing process. The stages may include, for example, printing, washing, and post curing. The gantry system includes a gantry rail and a gantry carriage. The gantry carriage can be removably attached to a build platform on which a printed object is printed and the gantry rail can then move the build platform between at least the printing and washing stages.

20 Claims, 24 Drawing Sheets

(51) Int. Cl.
*B29C 64/268* (2017.01)
*B29C 64/30* (2017.01)
*B29C 64/393* (2017.01)
*B33Y 30/00* (2015.01)
*B33Y 40/20* (2020.01)
*B33Y 50/02* (2015.01)

(52) U.S. Cl.
CPC ............ *B29C 64/393* (2017.08); *B33Y 30/00* (2014.12); *B33Y 40/20* (2020.01); *B33Y 50/02* (2014.12)

(56) References Cited

U.S. PATENT DOCUMENTS

2020/0094469 A1 3/2020 Holt et al.
2020/0122388 A1* 4/2020 Van Esbroeck .... A61C 13/0004

* cited by examiner

3D PRINTING AUTOMATION ASSISTED BY INTEGRATED ROBOTIC SYSTEM

PRIORITY CLAIM

This application claims priority to and the benefit of Provisional Application No. 63/517,504, filed in the U.S. Patent and Trademark Office on Aug. 3, 2023, the entire content of which is incorporated herein by reference as if fully set forth below in its entirety and for all applicable purposes.

TECHNICAL FIELD

The technology discussed below relates generally to three-dimensional (3D) printing devices, and in particular, to the automation of 3D printing devices.

BACKGROUND

The process of 3D printing based on Photopolymerization involves several stages. For example, the process may begin with the creation of a digital model of the desired object using computer-aided design (CAD) software. This model serves as the blueprint for the 3D printing process. The next stage may include slicing, where a specialized slicing software divides the digital model into multiple thin layers. Each layer represents a cross-section of the final object and determines the path the printer will follow during the printing process. Once the slicing is complete, a resin tank is prepared. This tank is filled with a liquid photopolymer resin that is sensitive to UV light. The resin is carefully selected based on the desired properties and characteristics of the final printed object.

The layer formation process begins by placing the resin tank beneath a light engine, such as a digital light projector containing a digital micromirror device (DMD), a liquid crystal display (LCD), a laser, or a similar technology. The DMD reflects light onto the surface of the resin, solidifying specific areas according to the pattern of each layer. The light exposure causes a chemical reaction within the resin, transforming it from liquid to solid. The layer-by-layer building process takes place as each cured layer is formed. After solidification of each layer, the build platform rises. This process continues until the entire object is created, with each layer adhering to the previous one. Once the printing is complete, the printed object undergoes post-processing steps to finalize its quality and usability. This typically involves removing the object from the printer and rinsing it in a solvent to remove any excess resin. The object may then be subjected to a curing process under UV light to ensure complete hardening and enhance its structural integrity.

SUMMARY

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to a three-dimensional (3D) printing device including a build platform, a printing module, a washing module, and a gantry system. The printing module is configured to print a printed object on the build platform. The printing module includes a resin tank and a first linear actuator configured to move the build platform in a linear motion into and out of the resin tank. The washing module is configured to rinse the printed object. The washing module includes a washing solvent tank and a second linear actuator configured to move the printed object on the build platform in a linear motion into and out of the washing solvent tank. The gantry system includes a gantry rail and a gantry carriage. The gantry carriage is configured to be removably attached to the build platform. The gantry rail is configured to move the build platform including the printed object from the first linear actuator to the second linear actuator.

In some aspects, the 3D printing device further includes a post curing module configured to cure the printed object. In some examples, the post curing module may include a curing tank and a third linear actuator configured to move the printed object in a linear motion into and out of the curing tank. In this example, the gantry rail is further configured to move the build platform including the printed object from the second linear actuator to the third linear actuator.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
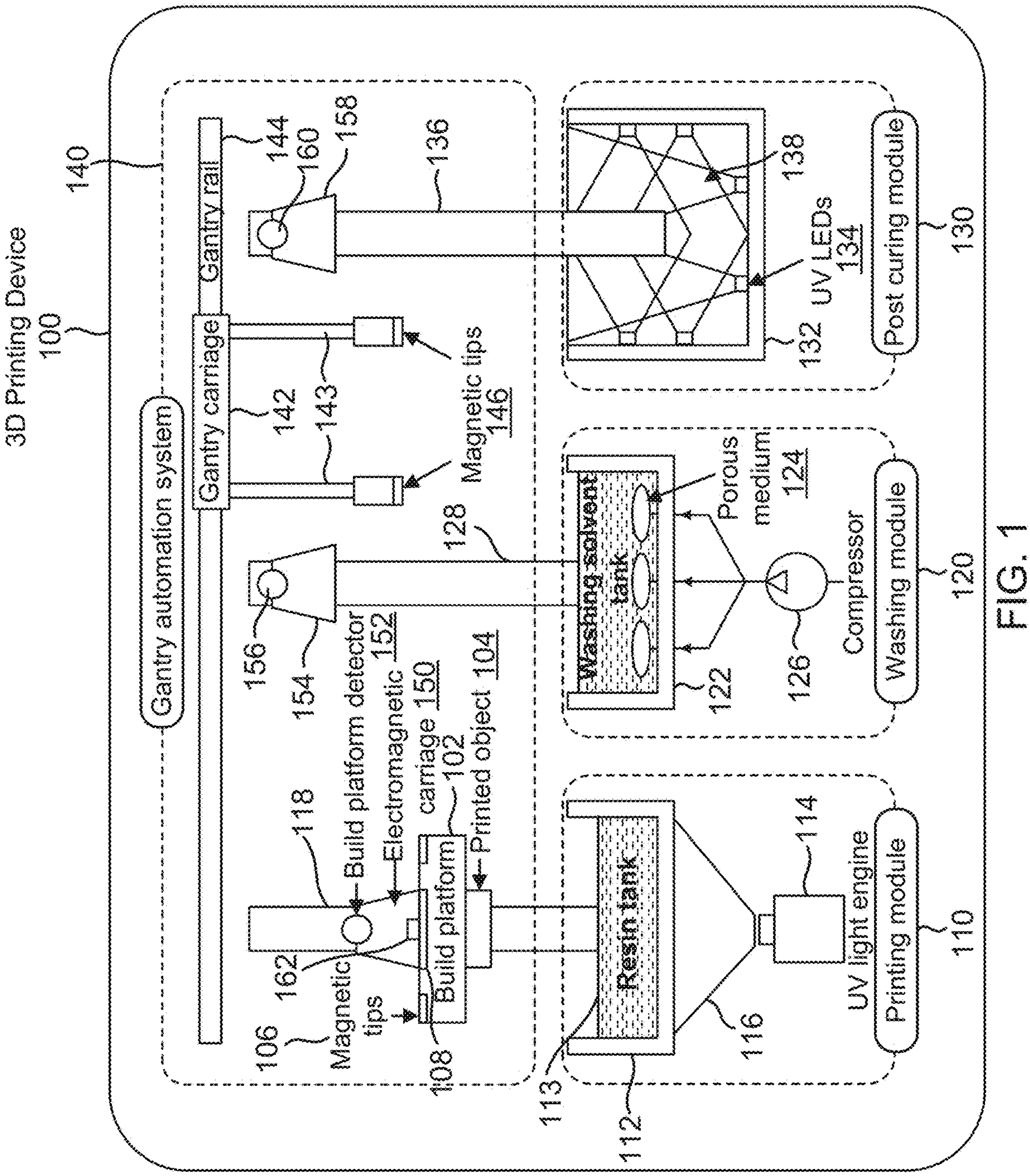
FIG. 1 is a diagram illustrating an example of a 3D printing device configured with a gantry system for automation according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The era of automation has significantly revolutionized the landscape of 3D printing, particularly in the realm of Photopolymerization technology. Photopolymerization-based 3D printers now boast a wide array of automation features that streamline and optimize the printing process. With the touch of a button, these printers seamlessly carry out tasks such as resin dispensing, building platform levelling, and adjusting printing parameters automatically. Automation ensures consistent and reliable printing results by eliminating the need for constant manual intervention. One notable aspect of automation in Photopolymerization based 3D printers is the inclusion of preprogrammed settings. Users can leverage a range of predefined profiles specifically tailored for different types of resins and print configurations.

Furthermore, automation extends to the generation of support structures. Complex geometries or overhanging features often require support during the printing process. 3D printers equipped with automation capabilities can generate these support structures automatically, intelligently adapting to the design and print parameters. This automation feature saves time and effort for users, who no longer need to meticulously add support themselves. Smart calibration is another key aspect of automation in Photopolymerization printers. These printers incorporate intelligent calibration features that automatically fine-tune various components such as the light engine, build platform, and resin tank. By ensuring optimal performance and print quality, smart calibration simplifies the initial setup process and minimizes the potential for manual errors.

Automation in 3D printers based on Photopolymerization also encompasses progress monitoring. Users can easily track the real-time progress of their prints through user-friendly interfaces that display the current layer being printed, estimated print time, and other relevant information. This allows for efficient workflow planning and remote monitoring. Moreover, automation enables effective print queue management. 3D printers equipped with this feature allow users to queue for multiple print jobs and prioritize them based on urgency or importance. When one print job is completed, the printer automatically proceeds to the next in the queue, minimizing downtime and maximizing productivity. Furthermore, automation in 3D printers incorporates error detection and recovery mechanisms. These printers possess the ability to detect potential issues during the printing process, such as resin flow problems, projector alignment issues, or power interruptions. Upon identifying such problems, the printer intelligently pauses the print job, alerts the user, and offers options for error recovery or resuming the print.

However, full automation of 3D printers has suffered from mechanical system complexity and lack of configurable designs. Aspects of the disclosure relate to a fully automated 3D printing device based on Photopolymerization. With such a fully automated 3D printing device, human interaction with the printer can be minimized or eliminated, thus avoiding mis-operation of the printing, increasing the printing accuracy, increasing the printing yield, and increasing human safety. The 3D printing device disclosed herein includes a gantry system for part translation between different printer stages. In addition, magnetic systems are used for the robust attachment of different parts, in conjunction with different sensors for measuring magnetic field strength, verticality measurements and level measurements with auto-fill systems. These aspects open the way for printing parallelism, thereby increasing the printing throughput.

FIG. 1 is a diagram illustrating an example of a 3D printing device configured with a gantry system for automation according to some aspects. The 3D printing device 100 includes a build platform 102 on which a printed object 104 is printed. The build platform 102 may be manufactured of any suitable material, including, for example, anodized aluminum. The build platform 102 further includes a set of magnetic tips 106 positioned on a top surface thereof.

The 3D printing device 100 further includes a printing module 110, a washing module 120, a post curing module 130, and a gantry system 140 (e.g., a gantry automation system). The printing module 110 includes a resin tank 112 including a resin 113 (e.g., a photopolymer or light-activated resin) utilized to print the printed object 104 on the build platform 102. The printing module 110 further includes a light engine 114 (e.g., an ultraviolet (UV) light engine or other suitable wavelength source) configured to project a light pattern 116 (e.g., a UV light pattern or other suitable wavelength pattern) corresponding to a layer of the printed object 104 into the resin tank 112 to form the layer of the printed object 104. The UV light engine 114 may include, for example, a digital light processing (DLP) engine, digital micromirror device (DMD), liquid crystal display (LCD), laser source, or other similar technology configured to project or display the pattern 116 into the resin tank 112. In some examples, the UV light engine 114 may further include a mirror (not shown) to reflect the pattern 116 into the resin tank 112. The pattern 116 may include, for example, white light forming the geometry of the patten surrounded by black areas. The white light reacts with the resin 113, transforming the areas in the resin 113 that receive the white light from liquid to solid.

The printing module 110 further includes a linear actuator 118 (e.g., a vertical axis or z-axis rail) configured to move the build platform into and out of the resin tank 112. For example, the linear actuator 118 may be configured to move the build platform 102 to a position inside the resin tank in which the thickness of resin 113 between the bottom of the resin tank 112 and the build platform 102 corresponds to the thickness of the first layer of the printed object 104. After formation of the first layer using the UV light engine 114, the linear actuator 118 can move the build platform 102 up (e.g., away from the bottom of the resin tank 112) a distance corresponding to the thickness of the next layer of the printed object 104. Each layer is built upon the previous layer in a similar manner to produce the final printed object 104.

There is a significant concern when using tightening/clamping methods where there is an inconstant external force exerted on the build platform, leading to inconstant internal stress that could lead to deflection or creep. Such stress has the potential to impact the printing process by causing a shift in the position of the build platform. Maintaining precise positioning of the build platform is critical for achieving accurate and reliable prints. Therefore, in various aspects, traditional systems are replaced with electromagnets or permanent magnets where there are no inconstant external forces exerted on the build platform. For example, as shown in FIG. 1, to secure the build platform 102 to the linear actuator 118, the linear actuator 118 can include an electromagnet carriage 150 configured to magnetically attach to a section 108 on a top surface of the build platform 102. The process of separating and attaching the build platform 102 to the linear actuator 150 is designed to be straightforward by simply placing the build platform directly under the electromagnet carriage 150.

In some examples, a magnetic field sensor 162 may be utilized to measure the magnetic field strength of the electromagnets 108/150. The magnetic field sensor 162 may be positioned on the electromagnetic carriage 150, as shown in FIG. 1, on the build platform 102, or on the linear actuator 118. The magnetic field sensor 162 may be configured to monitor the magnetic field strength of the electromagnets 108/150 to detect aging or malfunctioning of the electromagnets. For example, the magnetic field sensor 162 may be configured to detect when the magnetic field strength decreases or drops below a threshold and to generate an alert in response to the magnetic field strength decreasing below the threshold. For example, if the magnetic field strength drops below the threshold, the magnetic field sensor 162 may further trigger a voltage source to increase the voltage on the electromagnets to return to its normal level of operation, or in the case of fixed magnets (instead of electromagnets), may alert the system (e.g., a user) that the magnets (e.g., fixed magnets) should be changed.

The linear actuator 118 is further fixed (e.g., fixedly attached to an interior surface of a housing of the 3D printing device) to increase the mechanical rigidity of the build platform 102 and the lateral alignment of the build platform 102 with the UV light engine 114. Thus, the z-axis of the build platform 102 and printed object 104 is constantly aligned to the UV light engine 114.

The washing module 120 includes a washing solvent tank 122 including solvent, such as isopropyl alcohol or other suitable substance, configured to rinse the printed object 104 to remove any excess resin. To improve and automate the washing process, the washing solvent tank 122 further includes a porous medium 124 (e.g., porous disks) positioned near the bottom of the washing solvent tank 122. A compressor 126 may be configured to pump air through the porous disks 124 to produce bubbles inside the washing solvent tank that are configured to rinse the printed object 104. The washing module 120 further includes a linear actuator 128 fixedly attached to the interior surface of the housing of the 3D printing module and configured to move the build platform 102 including the final printed object 104 into and out of the washing solvent tank 122 to rinse the printed object 104. The linear actuator 128 further includes an electromagnetic carriage 154 configured to magnetically attach to the section 108 on the build platform 102 to secure the build platform 102 including the printed object 104 to the linear actuator 128.

The post curing module 130 includes a curing tank 132 including a plurality of UV lights 134 (e.g., light-emitting diodes (LEDs)) configured to emit UV light 138 to cure and further harden the printed object 104. In some examples, as shown in FIG. 1, similar to the printing module 110 and the washing module 120, the post curing module 130 may further include a linear actuator 136 fixedly attached to the interior surface of the housing of the 3D printing module and configured to move the build platform 102 including the final printed object 104 into and out of the curing tank 132 to cure the printed object 104. The linear actuator 136 further includes an electromagnetic carriage 158 configured to magnetically attach to the section 108 on the build platform 102 to secure the build platform 102 including the printed object 104 to the linear actuator 136.

Each of the electromagnetic carriages 150, 154, and 158 in each of the three stages (printing, washing, and post curing) may further include a respective build platform detector (e.g., platform detection sensor) 152, 156, and 160 configured to detect when the build platform 102 is attached to the respective electromagnetic carriage 150, 154, and 158 and thus to the respective linear actuator 118, 128, and 136. Upon detecting the attachment of the build platform 102, the corresponding stage may initiate its process (e.g., printing, washing or curing) by moving the build platform 102 into the corresponding tank 112, 122, or 132. This further allows for full automation of the overall process without human intervention.

The gantry system 140 includes a gantry carriage 142 and a gantry rail 144. The gantry carriage 142 includes two handles 143, each having a corresponding magnetic tip 146 at the end thereof. The magnetic tips 146 of the gantry carriage 142 are configured to magnetically attach to the magnetic tips 106 of the build platform 102. The gantry rail 144 is configured to move the build platform 102 including the printed object 104 along a specific direction (e.g., an x-axis direction) between the linear actuators 118, 128, and 136. For example, after forming the printed object 104 on the build platform 102 in the printing stage, the linear actuator 118 can move the build platform 102 up to engage with the gantry system 140. The gantry carriage 142 can then be positioned over the build platform 102 to enable the magnetic tips 106 and 146 to come into contact with one another and magnetically attach the build platform 102 to the gantry carriage 142.

In some examples, the magnetic tips 106 and 146 include electromagnets that may be turned on when they come into contact. The electromagnets 108 and 150 securing the build platform 102 to the linear actuator 118 may then be turned off to release the build platform 102 from the linear actuator 118, allowing the gantry rail 144 to move the gantry carriage 142 including the build platform 102 and printed object 104 from the printing stage to the washing stage (e.g., from the linear actuator 118 of the printing module 110 to the linear actuator 128 of the washing module 120). The build platform 102 may then be magnetically attached to the linear actuator 128 of the washing module 120 using electromagnets 108 and 154. After that, the linear actuator 128 may then move the build platform 102 including the printed object 104 into the washing solvent tank 122. This process may then be repeated in the post curing stage.

Figure 2A:
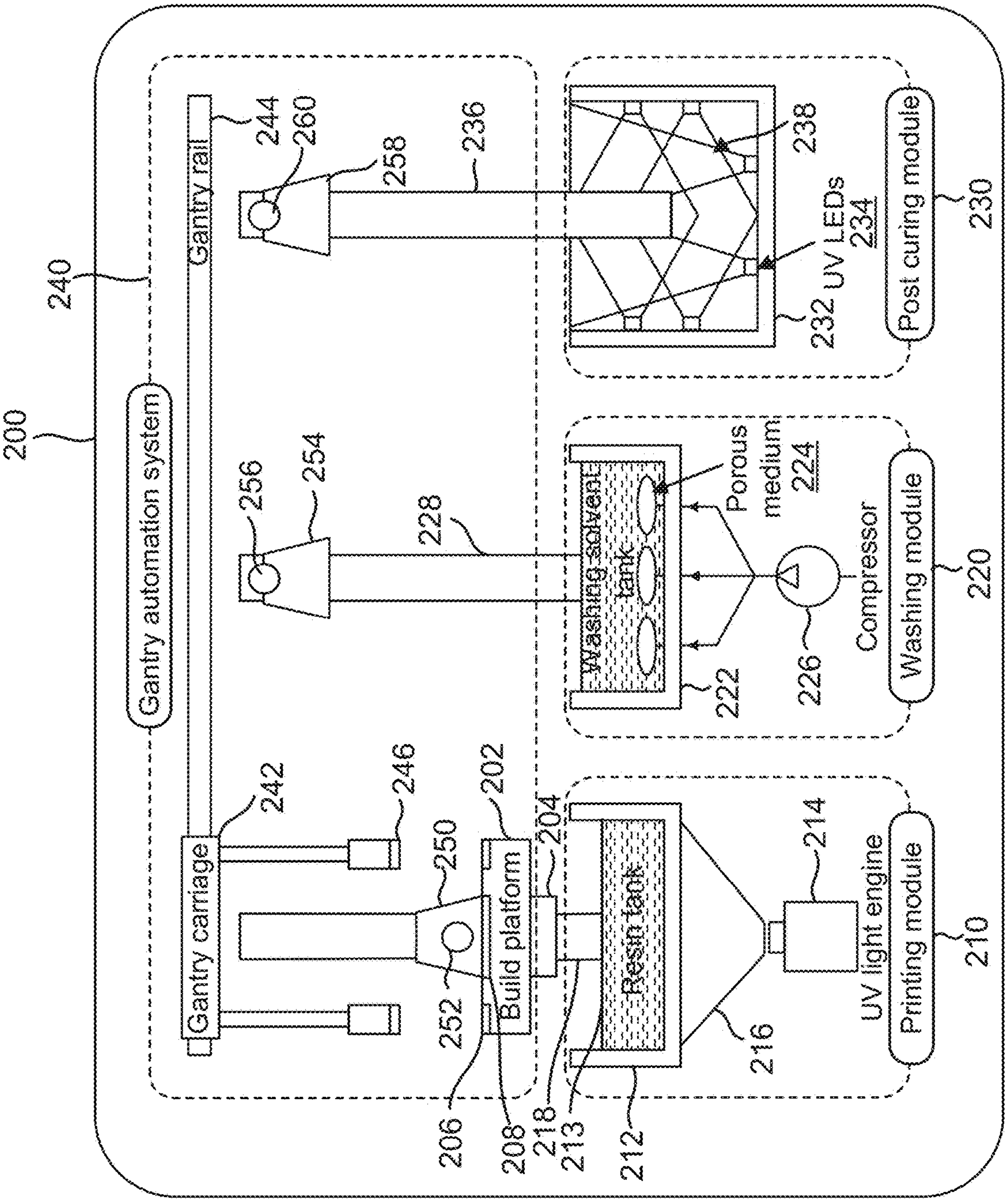
FIGS. 2A-2O are diagrams illustrating an exemplary workflow of the 3D printing device according to some aspects.
Figure 2B:
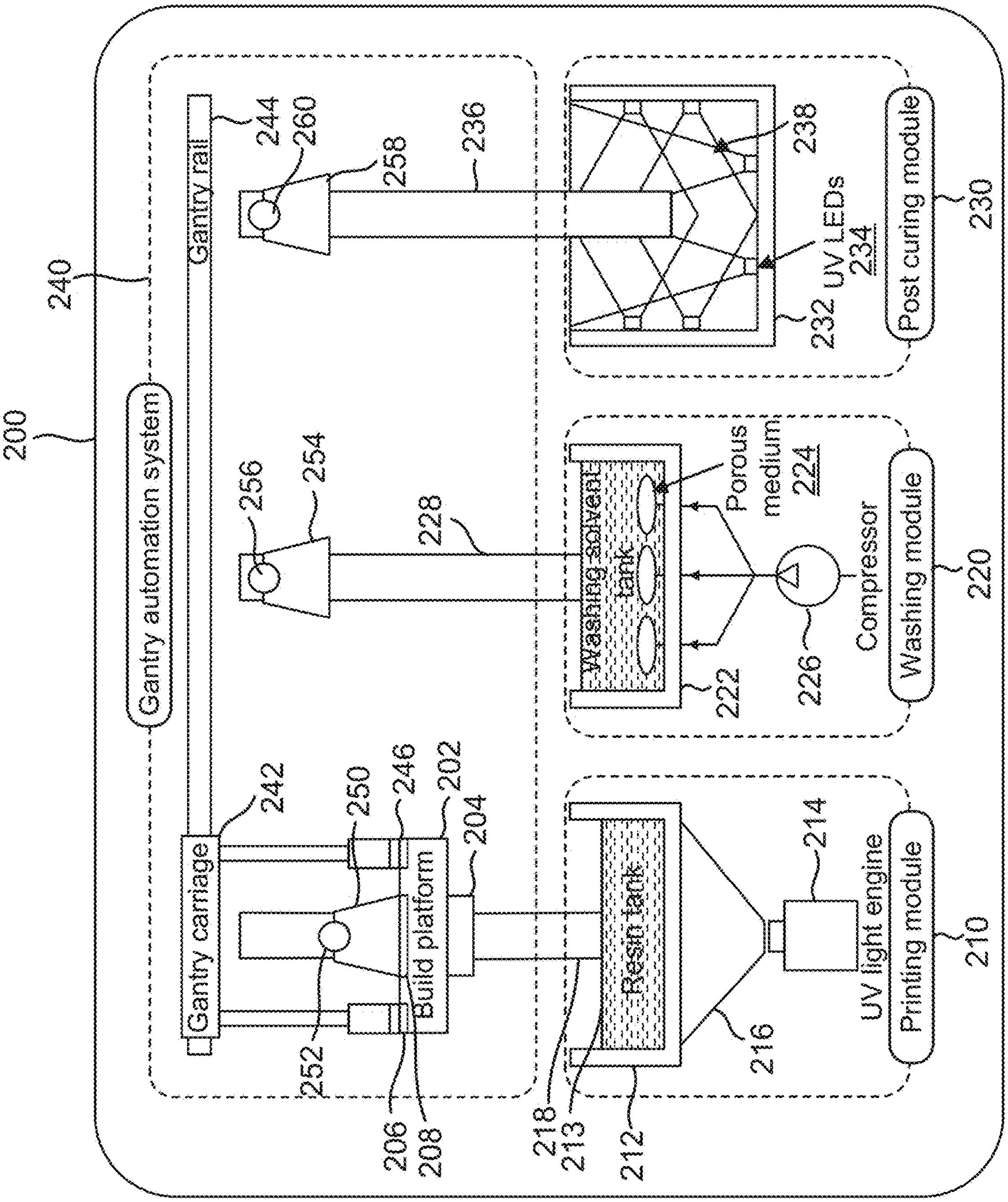
Figure 2C:
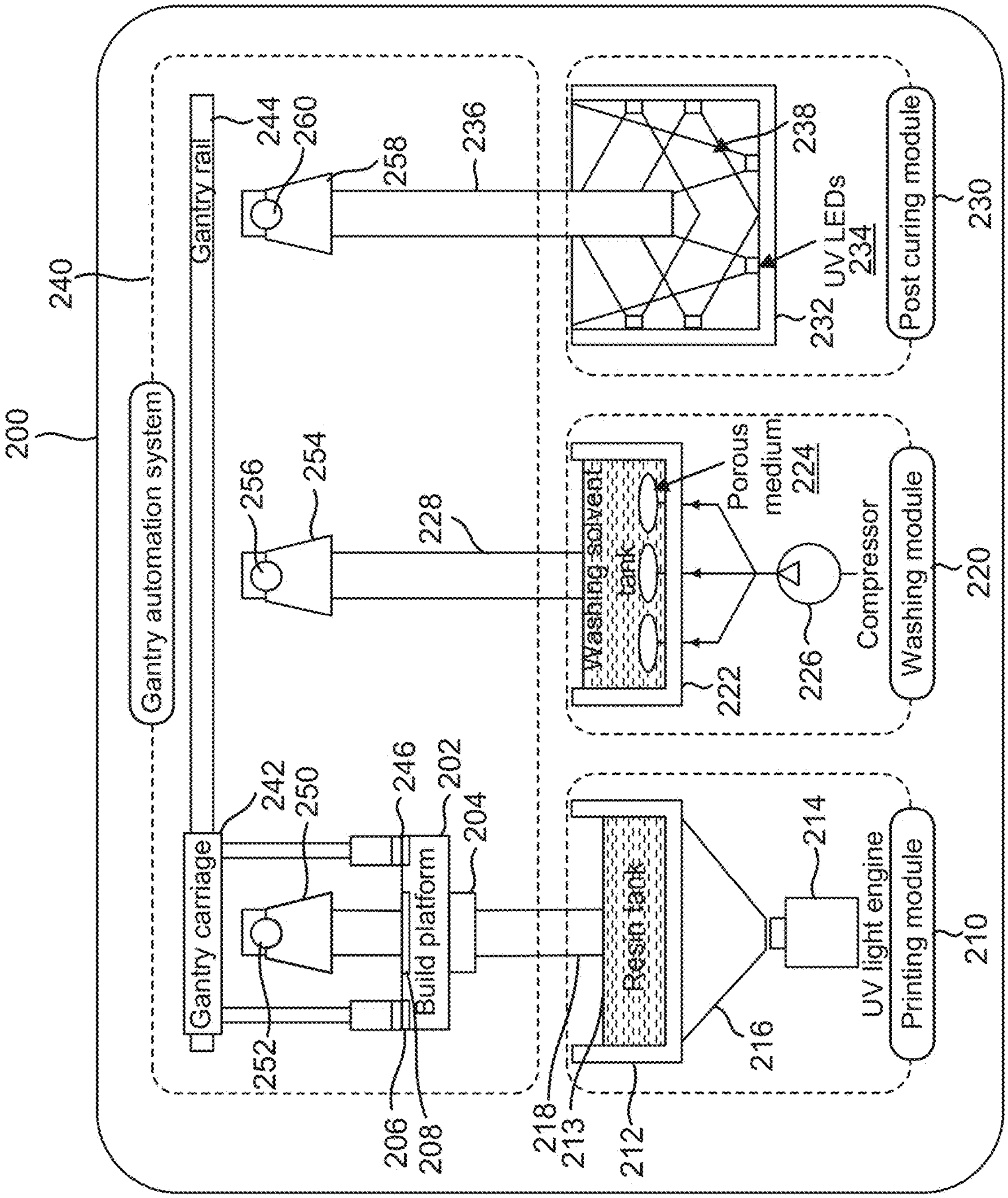
Figure 2D:
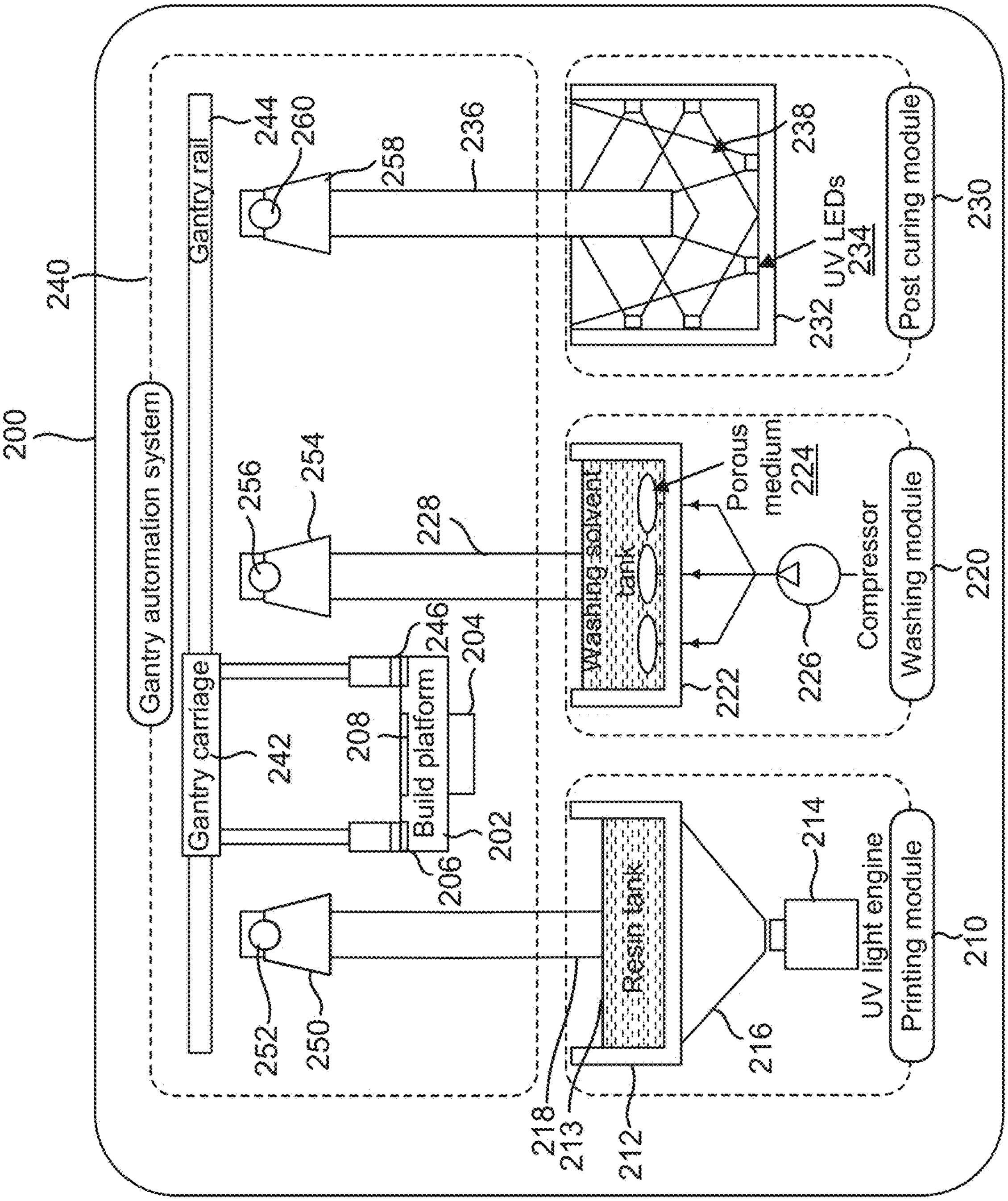
Figure 2E:
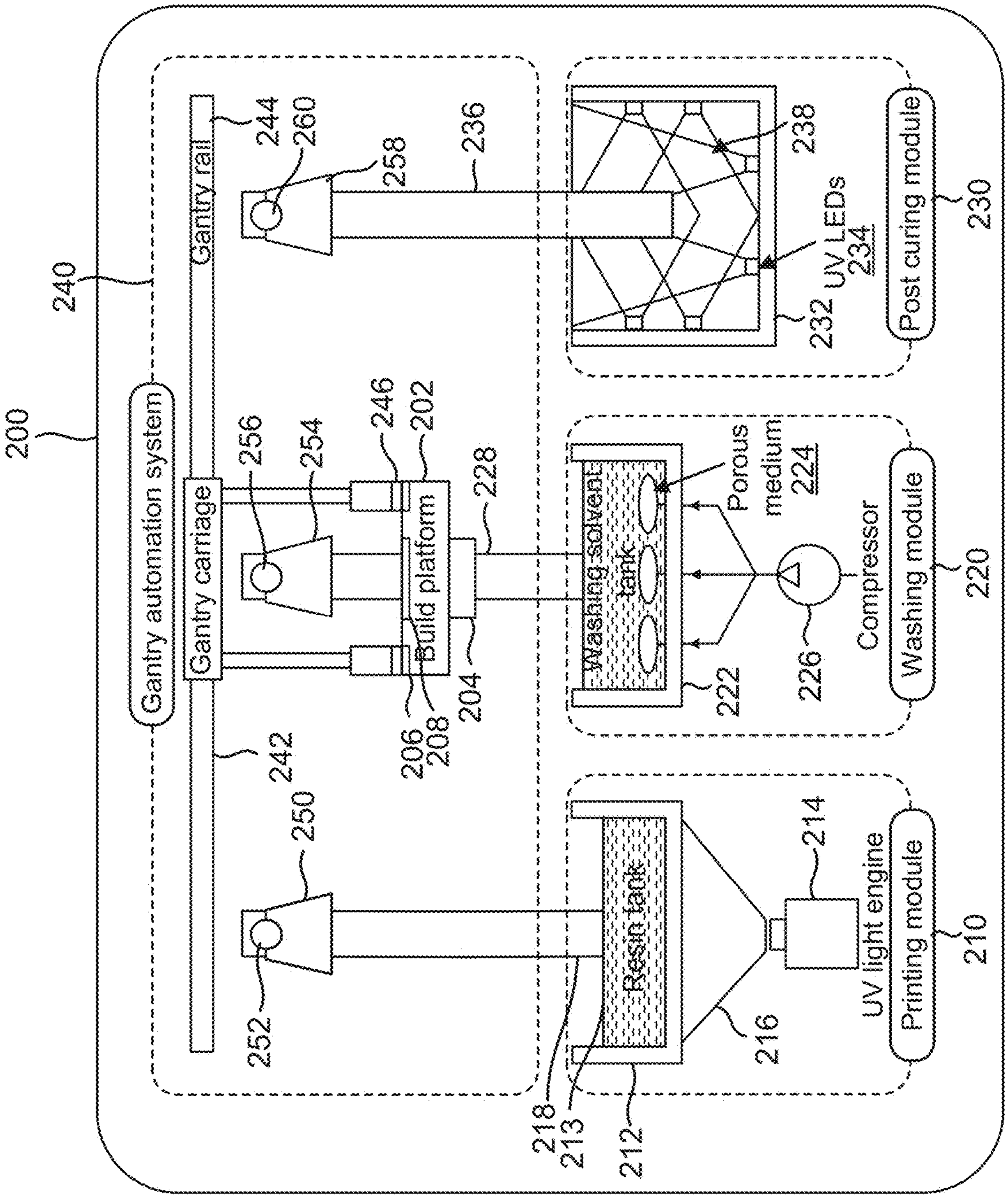
Figure 2F:
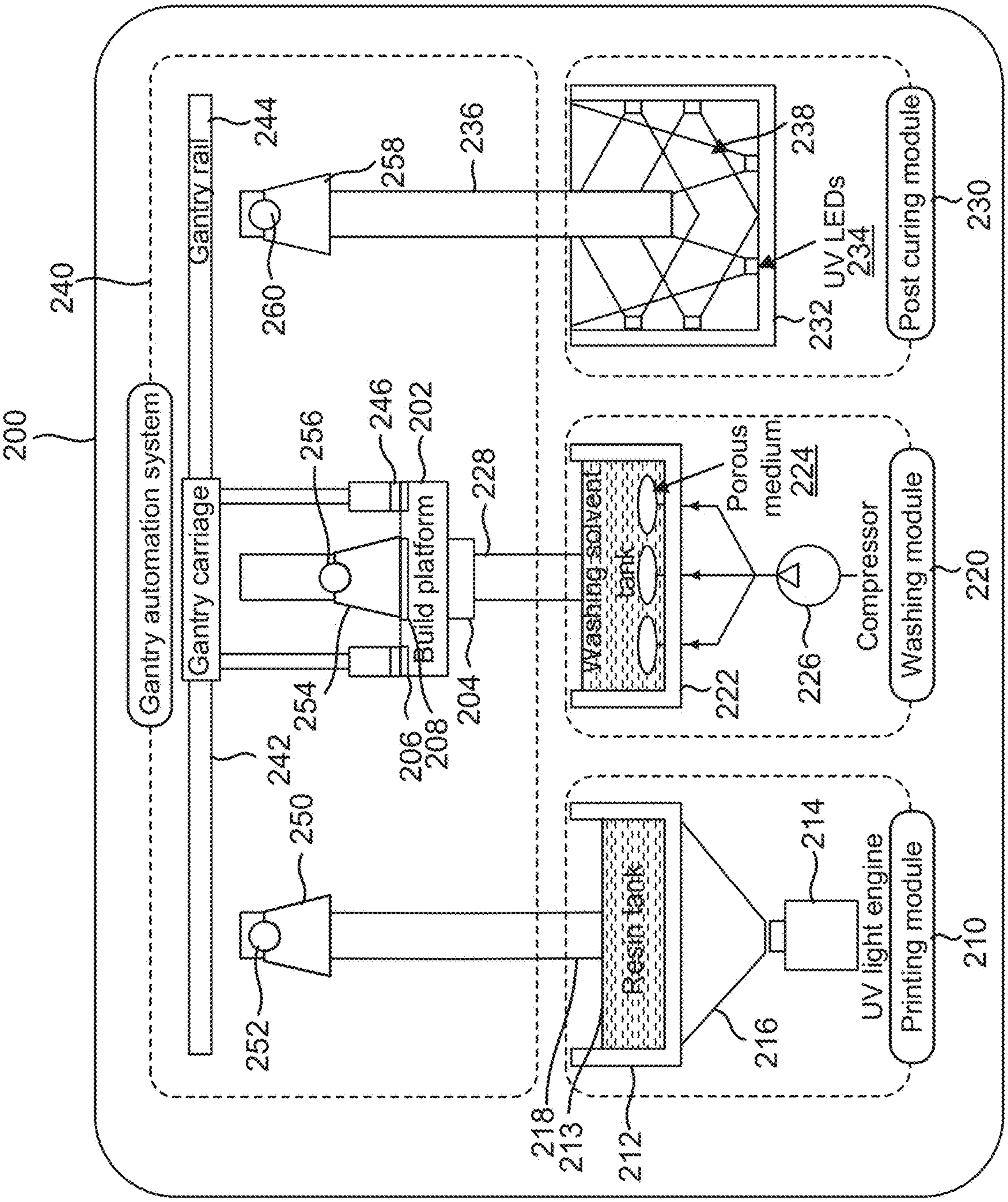
Figure 2G:
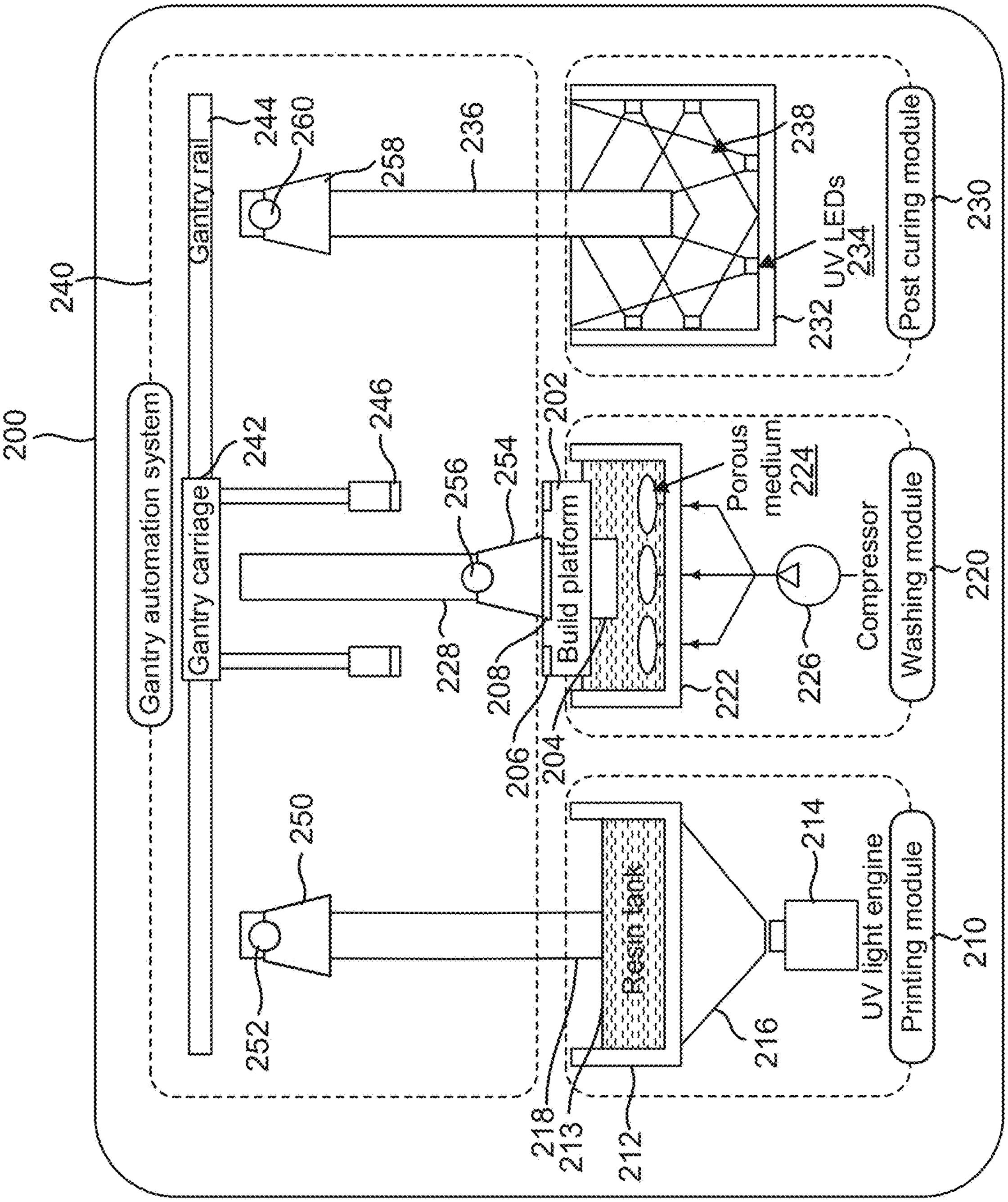
Figure 2H:
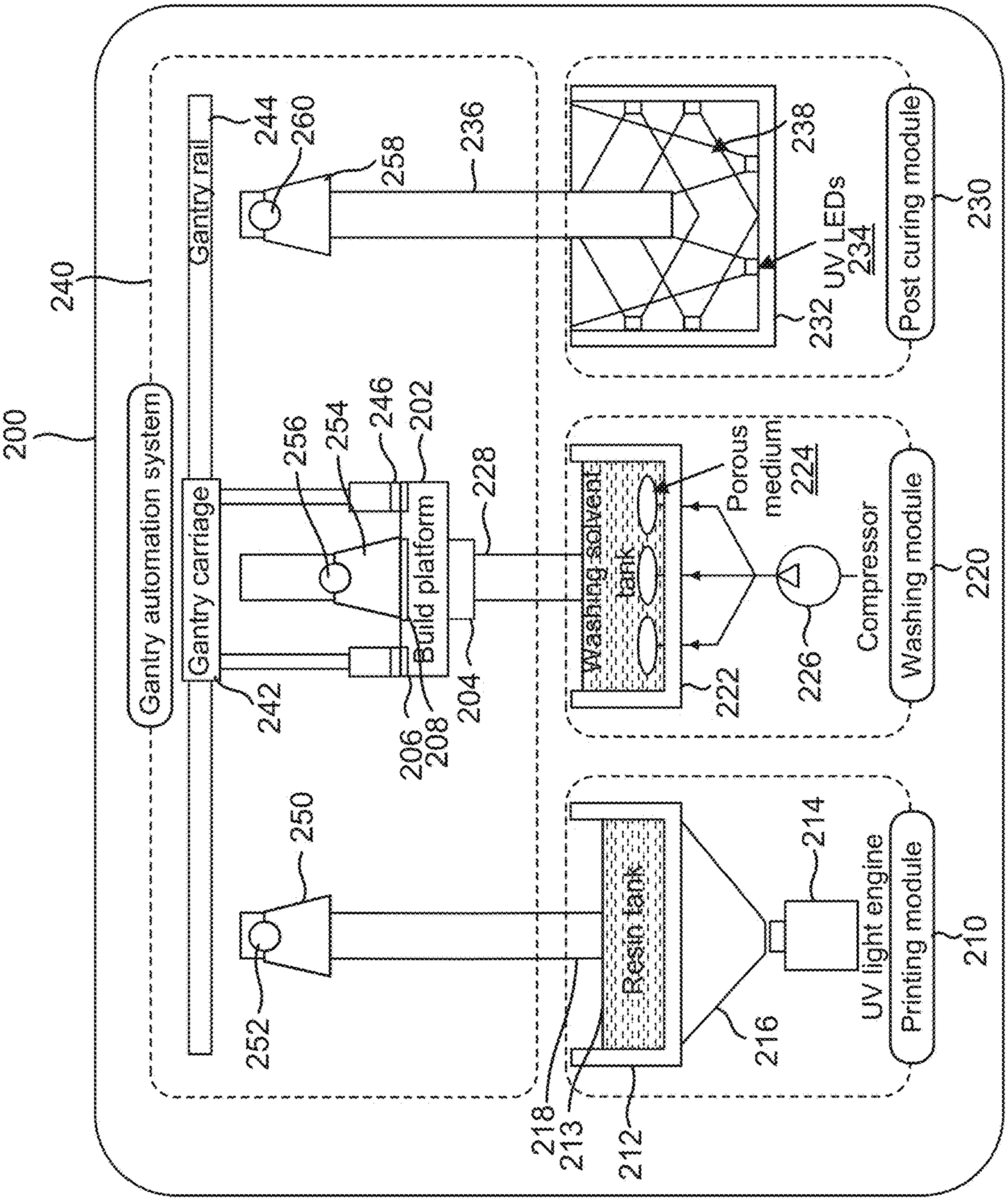
Figure 2I:
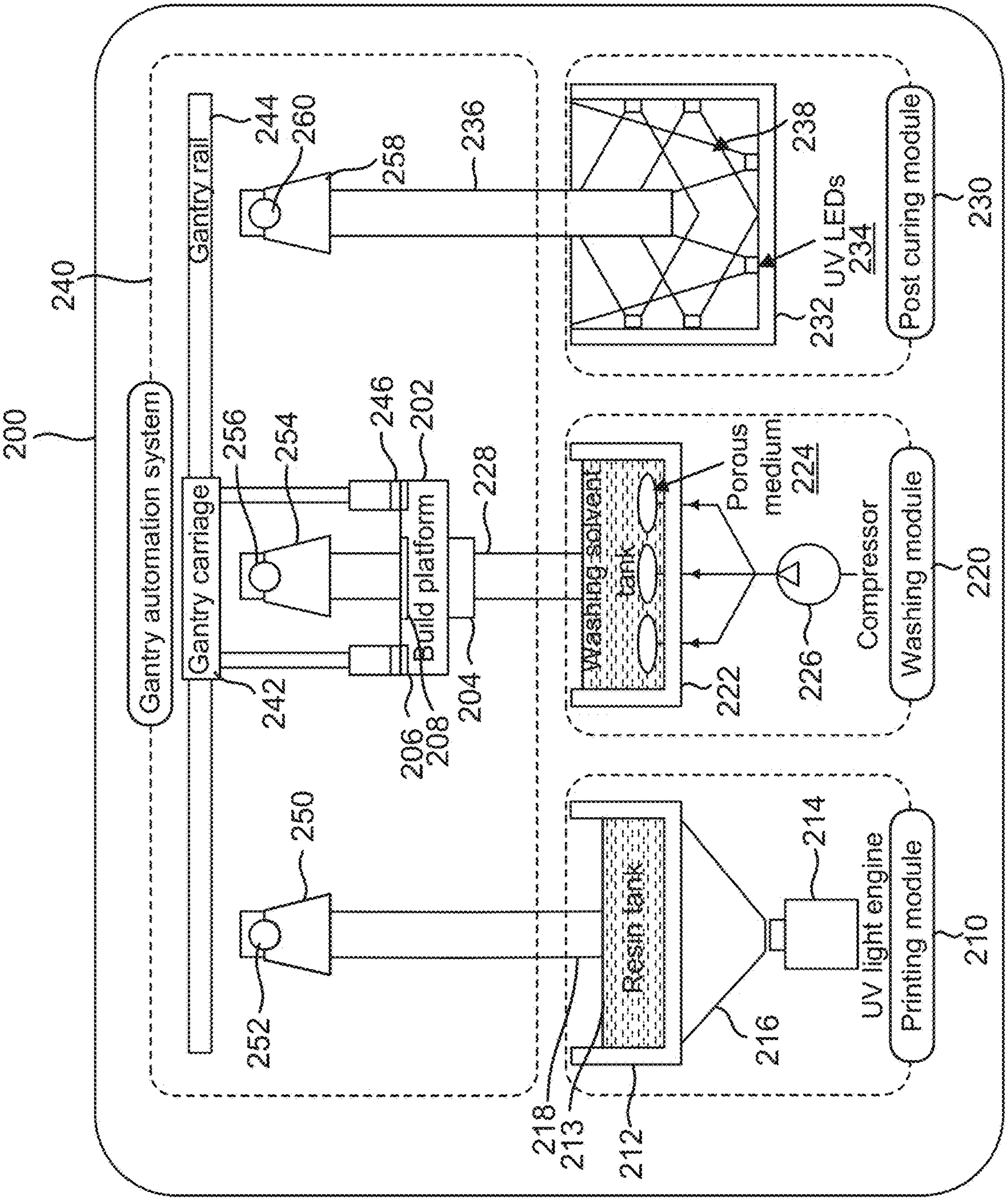
Figure 2J:
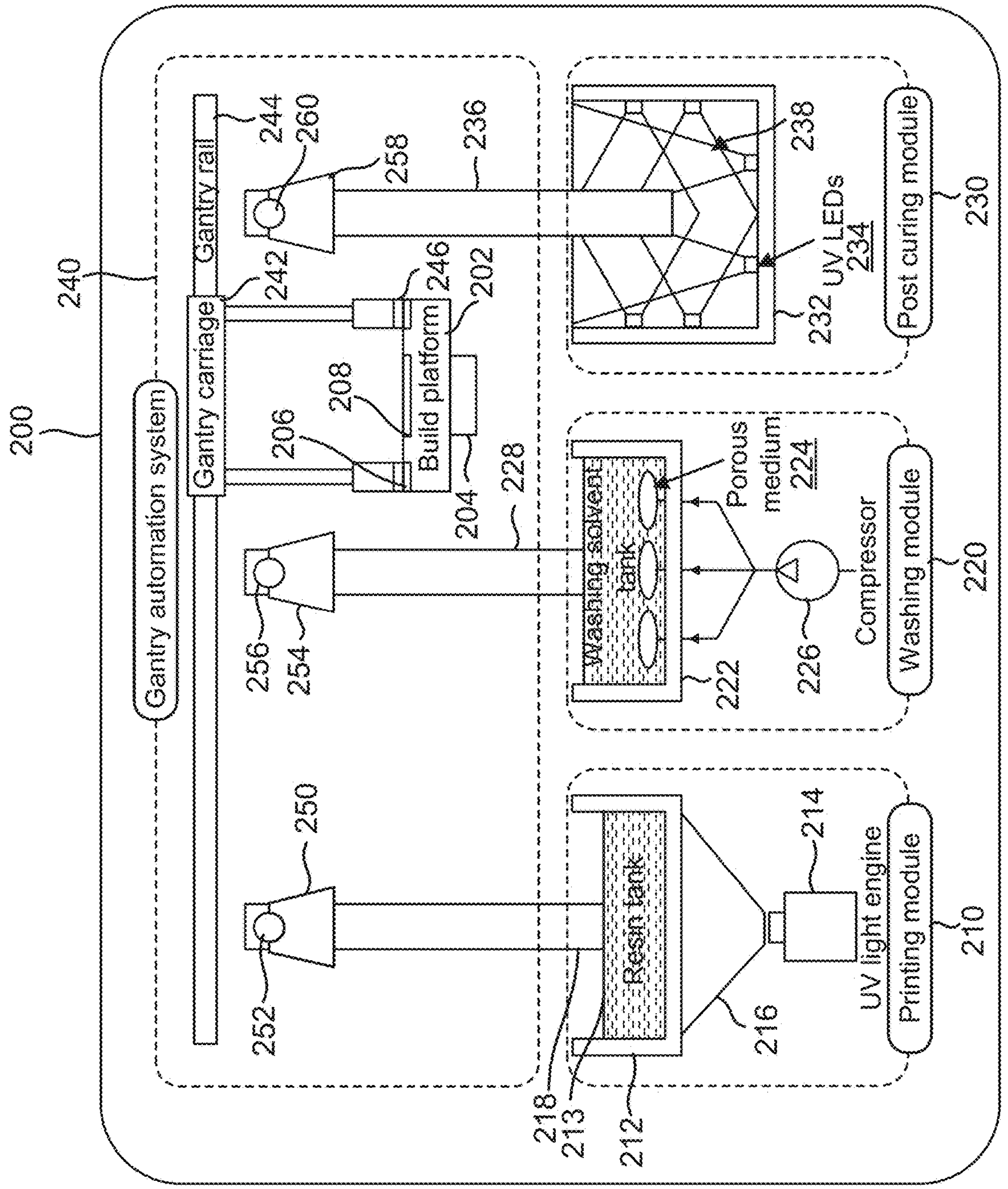
Figure 2K:
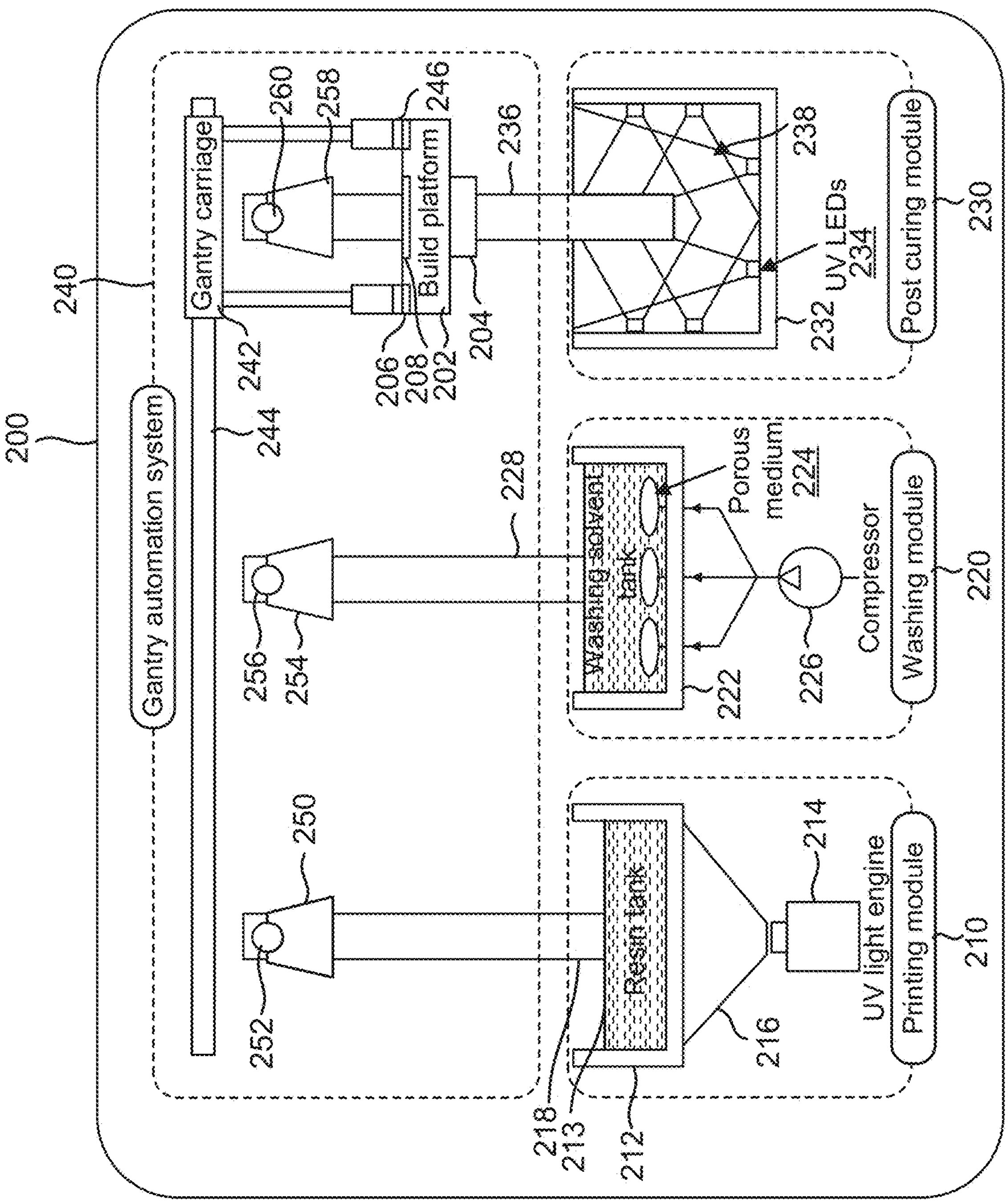
Figure 2L:
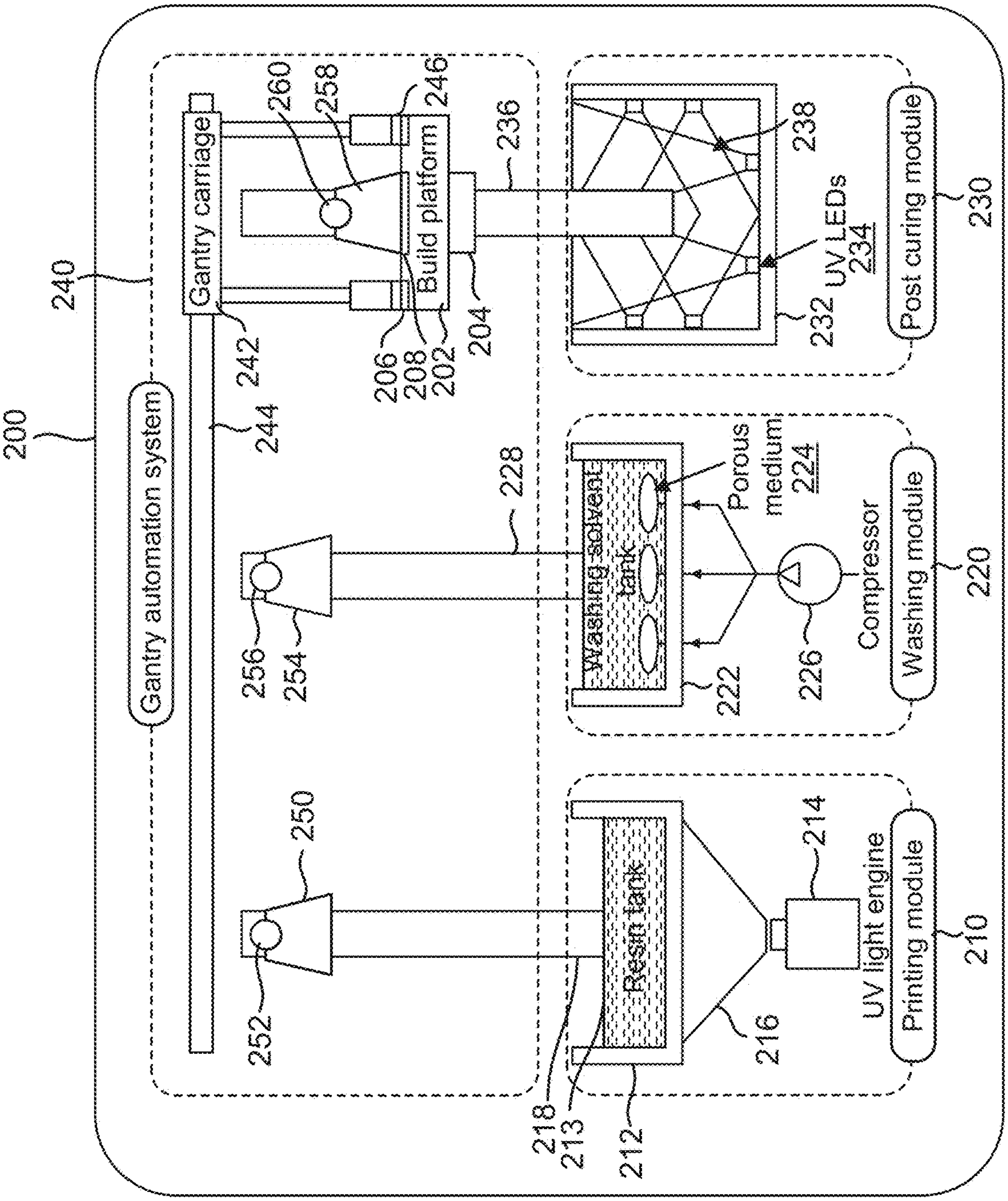
Figure 2M:
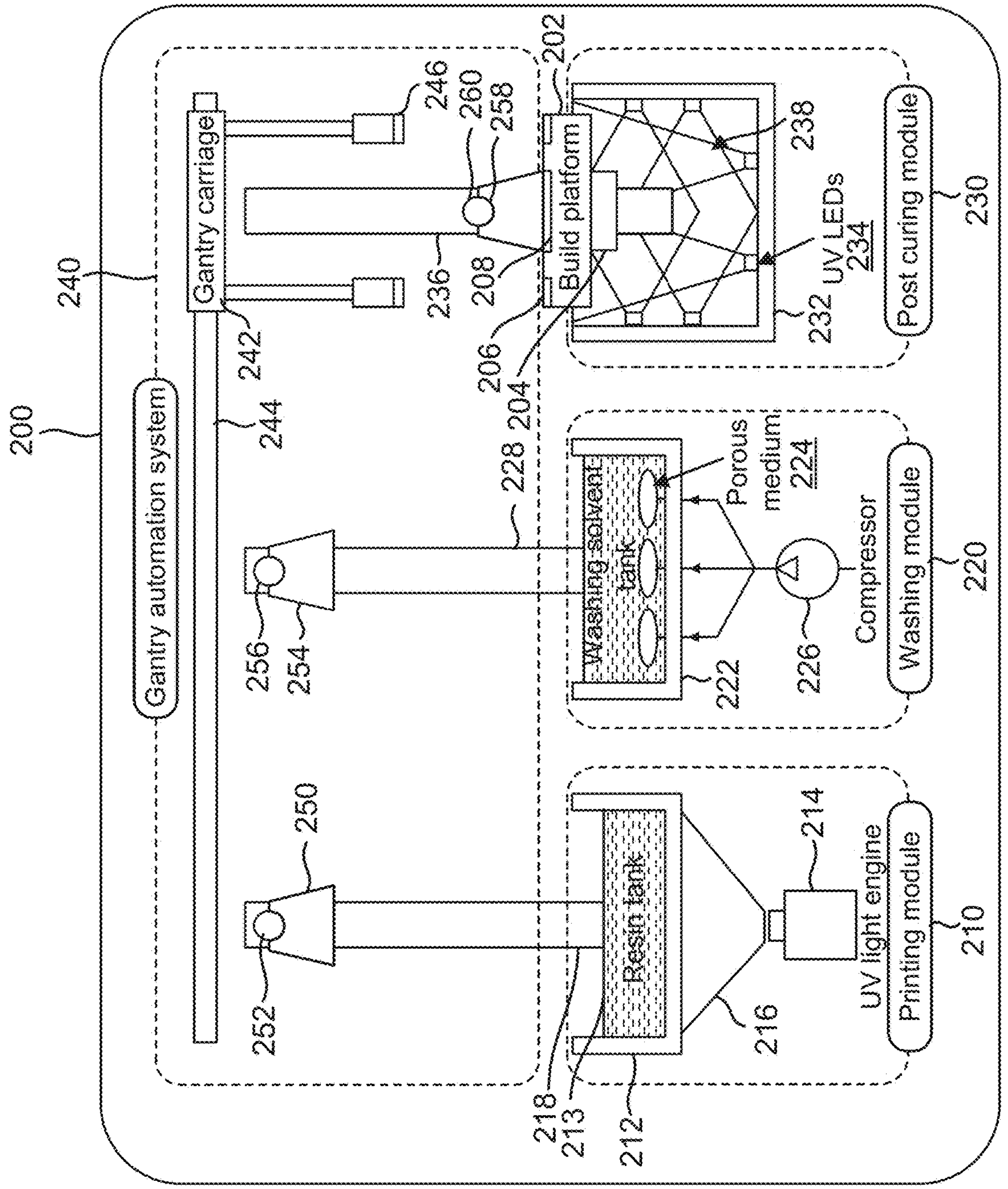
Figure 2N:
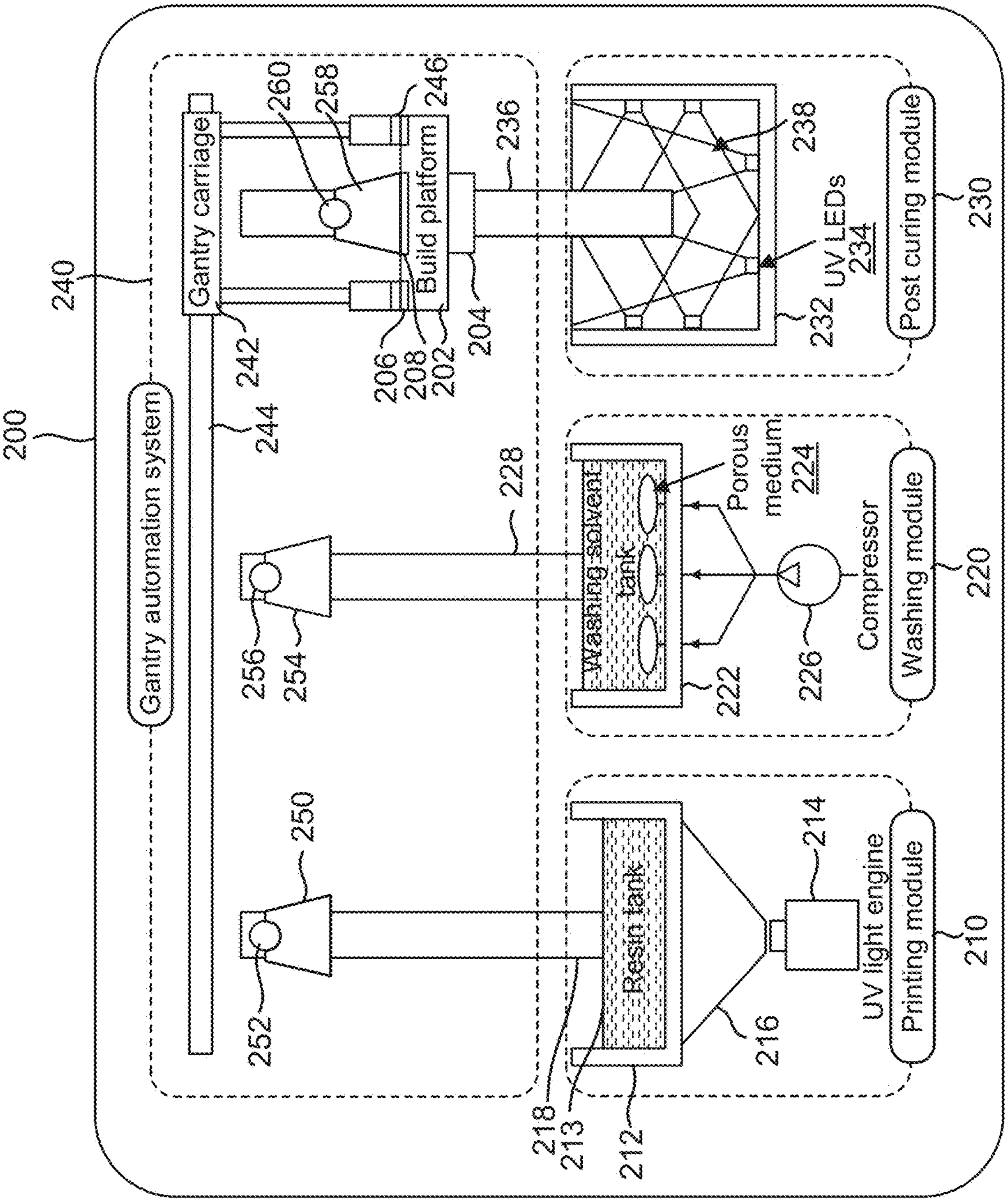
Figure 2O:
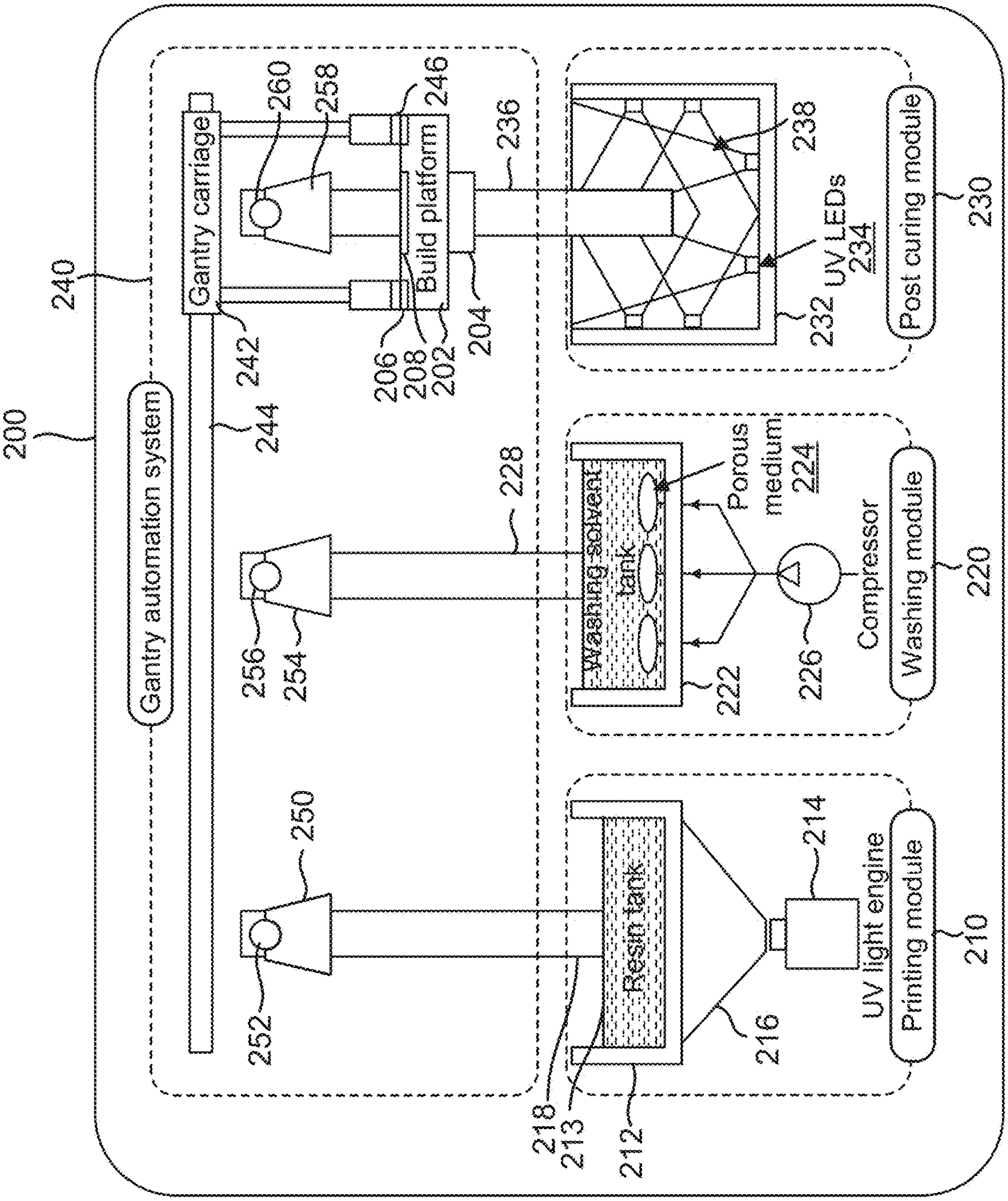

FIGS. 2A-2O are diagrams illustrating an exemplary workflow of the 3D printing device according to some aspects. The 3D printing device 200 includes a build platform 202 on which a printed object 204 is printed. The build platform 202 further includes a set of magnetic tips 206 positioned on a top surface thereof. The 3D printing device 200 further includes a printing module 210, a washing module 220, a post curing module 230, and a gantry system 240 (e.g., a gantry automation system), as in FIG. 1. The printing module 210 includes a resin tank 212 including a resin 213 (e.g., a photopolymer or light-activated resin) utilized to print the printed object 204 on the build platform 202. The printing module 210 further includes a UV light engine 214 configured to project a UV light pattern 216 corresponding to a layer of the printed object 204 into the resin tank 212 to form the layer of the printed object 204. The printing module 210 further includes a linear actuator 218 (e.g., a vertical axis rail) configured to move the build platform into and out of the resin tank 212. To secure the build platform 202 to the linear actuator 218, the linear actuator 218 can include an electromagnet carriage 250 configured to magnetically attach to a section 208 on the top surface of the build platform 202.

The washing module 220 includes a washing solvent tank 222 including solvent, such as isopropyl alcohol or other suitable substance, configured to rinse the printed object 104 to remove any excess resin. To improve and automate the washing process, the washing solvent tank 222 further includes a porous medium 224 (e.g., porous disks) positioned near the bottom of the washing solvent tank 222. A compressor 226 may be configured to pump air through the porous disks 224 to produce bubbles inside the washing solvent tank that are configured to rinse the printed object 204. The washing module 220 further includes a linear actuator 228 configured to move the build platform 202 including the final printed object 204 into and out of the washing solvent tank 222 to rinse the printed object 204. The linear actuator 228 further includes an electromagnetic carriage 254 configured to magnetically attach to the section 208 on the build platform 202 to secure the build platform 202 including the printed object 204 to the linear actuator 228.

The post curing module 230 includes a curing tank 232 including a plurality of UV lights 234 (e.g., light-emitting diodes (LEDs)) configured to emit UV light 238 to cure and further harden the printed object 204. The post curing module 230 may further include a linear actuator 236 configured to move the build platform 202 including the final printed object 204 into and out of the curing tank 232 to cure the printed object 204. The linear actuator 236 further includes an electromagnetic carriage 258 configured to magnetically attach to the section 208 on the build platform 202 to secure the build platform 202 including the printed object 204 to the linear actuator 236. Each of the electromagnetic carriages 250, 254, and 258 in each of the three stages (printing, washing, and post curing) may further include a respective build platform detector (e.g., platform detection sensor) 252, 256, and 260 configured to detect when the build platform 202 is attached to the respective electromagnetic carriage 250, 254, and 258 and thus to the respective linear actuator 218, 228, and 236.

The gantry system 240 includes a gantry carriage 242 and a gantry rail 44. The gantry carriage 242 includes two handles, each having a corresponding magnetic tip 246 at the end thereof. The magnetic tips 246 of the gantry carriage 242 are configured to magnetically attach to the magnetic tips 206 of the build platform 202. The gantry rail 244 is configured to move the build platform 202 including the printed object 204 between the linear actuators 218, 228, and 236.

In the workflow diagram shown in FIG. 2A, the printing module 210 has completed the 3D printing process and the linear actuator 218 is moving the build platform 202 up to engage with the gantry carriage 242. In addition, the gantry rail 244 has moved the gantry carriage 242 into a position over the build platform 202. As shown in FIG. 2B, the build platform 202 can then engage with the gantry carriage 242 by magnetically attaching the magnetic tips 206 of the build platform to the magnetic tips 246 of the gantry carriage. Electromagnetic carriage disengagement then follows, as shown in FIG. 2C. For example, the electromagnets 208 and 250 may be turned off, thus allowing the electromagnetic carriage 250 to be disengaged from the build platform 202 and moved further up the vertical rail (linear actuator) 218. In FIGS. 2D and 2E, the build platform 202 can then be moved from the printing module 210 to the washing module 220. For example, the gantry rail 244 may be configured to laterally move the gantry carriage having the build platform magnetically attached thereto from the linear actuator 218 of the printing module 210 to the linear actuator 228 of the washing module 220. In FIG. 2F, electromagnetic carriage engagement of the electromagnetic carriage 254 of the washing module 220 is illustrated. For example, the linear actuator 228 of the washing module 220 may be configured to vertically move the electromagnetic carriage 254 down to the build platform 202 and the voltage to the electromagnets 208 and 254 may be turned on to magnetically attach the build platform 202 to the linear actuator 228.

As shown in FIG. 2G, the gantry carriage 242 may be disengaged from the build platform and the linear actuator 228 may move the build platform 202 and printed object 204 into the washing solvent tank 222 to begin the washing process. For example, the voltage to the magnetic tips 206 and 246 may be turned off or the linear actuator 228 may apply a downward force on the build platform 202 to disengage the build platform 202 from the gantry carriage 242. Once the washing process ends, as shown in FIG. 2H, the linear actuator 228 may be configured to move the build platform 202 back up to engage with the gantry carriage 242 (e.g., by magnetically attaching the magnetic tips 206/246). In FIG. 2I, the electromagnetic carriage 254 may be disengaged from the build platform 202 (e.g., by turning off the electromagnets 208 and 254 and moving the electromagnetic carriage 254 up and away from the build platform 202).

In FIGS. 2J and 2K, the build platform 202 can then be moved from the washing module 220 to the post curing module 230. For example, the gantry rail 244 may be configured to laterally move the gantry carriage having the build platform magnetically attached thereto from the linear actuator 228 of the washing module 220 to the linear actuator 236 of the post curing module 230. In FIG. 2L, electromagnetic carriage engagement of the electromagnetic carriage 258 of the post curing module 230 is illustrated. For example, the linear actuator 236 of the post curing module 230 may be configured to vertically move the electromagnetic carriage 258 down to the build platform 202 and the voltage to the electromagnets 208 and 258 may be turned on to magnetically attach the build platform 202 to the linear actuator 236.

As shown in FIG. 2M, the gantry carriage 242 may be disengaged from the build platform 202 and the linear actuator 236 may move the build platform 202 and printed object 204 into the curing tank 232 to begin the curing process. For example, the voltage to the magnetic tips 206 and 246 may be turned off or the linear actuator 236 may apply a downward force on the build platform 202 to disengage the build platform 202 from the gantry carriage 242. Once the curing process ends, as shown in FIG. 2N, the linear actuator 236 may be configured to move the build platform 202 back up to engage with the gantry carriage 242 (e.g., by magnetically attaching the magnetic tips 206/246). In FIG. 2O, the electromagnetic carriage 258 may be disengaged from the build platform 202 (e.g., by turning off the electromagnets 208 and 258 and moving the electromagnetic carriage 258 up and away from the build platform 202) and the printed object 204 may then be removed from the 3D printing device 200. For example, a user may remove the build platform 202 from the 3D printing device and detach the printed object 204 from the build platform 202 using, for example, a spatula, scrubber, or other suitable tool.

Figure 3:
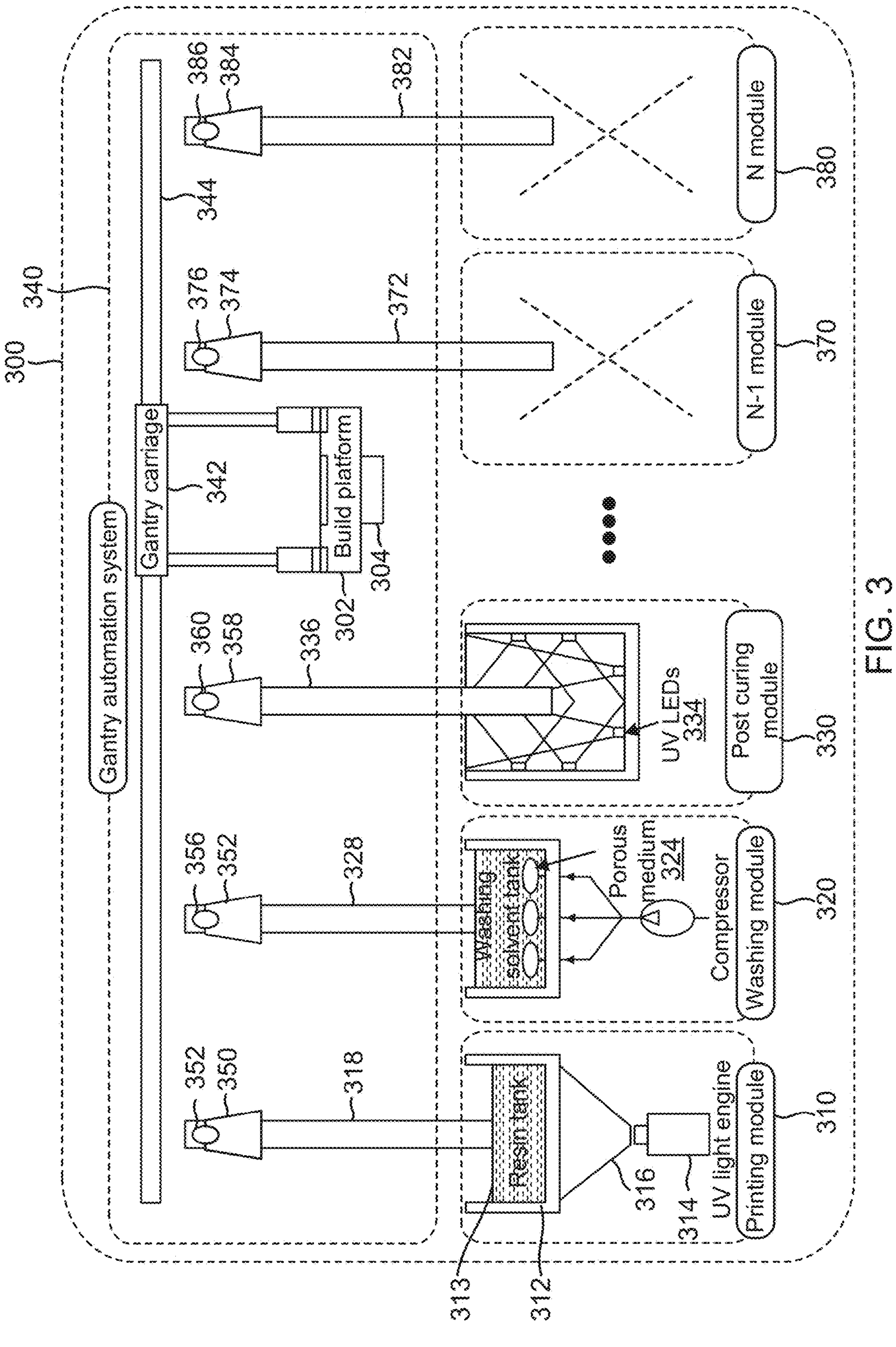
FIG. 3 is a diagram illustrating an example of an expandable design scheme for the 3D printing device according to some aspects.

FIG. 3 is a diagram illustrating an example of an expandable design scheme for the 3D printing device according to some aspects. As in the example shown in FIG. 1, the 3D printing device 300 shown in FIG. 3 includes a build platform 302 on which a printed object 304 is printed. The build platform 302 further includes a set of magnetic tips 306 positioned on a top surface thereof. The 3D printing device 300 further includes a printing module 310, a washing module 320, a post curing module 330, and a gantry system 340 (e.g., a gantry automation system), as in FIG. 1. The printing module 310 includes a resin tank 312 including a resin 313 (e.g., a photopolymer or light-activated resin) utilized to print the printed object 304 on the build platform 302. The printing module 310 further includes a UV light engine 314 configured to project a UV light pattern 316 corresponding to a layer of the printed object 304 into the resin tank 312 to form the layer of the printed object 304. The printing module 310 further includes a linear actuator 318 (e.g., a vertical axis rail) configured to move the build platform into and out of the resin tank 312. To secure the build platform 302 to the linear actuator 318, the linear actuator 318 can include an electromagnet carriage 350 configured to magnetically attach to a section 308 on the top surface of the build platform 302.

The washing module 320 includes a washing solvent tank 322 including solvent, such as isopropyl alcohol or other suitable substance, configured to rinse the printed object to remove any excess resin. To improve and automate the washing process, the washing solvent tank 322 further includes a porous medium 324 (e.g., porous disks) positioned near the bottom of the washing solvent tank 322. A compressor 336 may be configured to pump air through the porous disks 324 to produce bubbles inside the washing solvent tank that are configured to rinse the printed object 304. The washing module 320 further includes a linear actuator 328 configured to move the build platform 302 including the final printed object 304 into and out of the washing solvent tank 322 to rinse the printed object 304. The linear actuator 328 further includes an electromagnetic carriage 354 configured to magnetically attach to the section 308 on the build platform 302 to secure the build platform 302 including the printed object 304 to the linear actuator 328.

The post curing module 330 includes a curing tank 332 including a plurality of UV lights 334 (e.g., light-emitting diodes (LEDs)) configured to emit UV light 338 to cure and further harden the printed object 304. The post curing module 330 may further include a linear actuator 336 configured to move the build platform 302 including the final printed object 304 into and out of the curing tank 332 to cure the printed object 304. The linear actuator 336 further includes an electromagnetic carriage 358 configured to magnetically attach to the section 308 on the build platform 302 to secure the build platform 302 including the printed object 304 to the linear actuator 336. Each of the electromagnetic carriages 350, 354, and 358 in each of the three stages (printing, washing, and post curing) may further include a respective build platform detector (e.g., platform detection sensor) 352, 356, and 360 configured to detect when the build platform 302 is attached to the respective electromagnetic carriage 350, 354, and 358 and thus to the respective linear actuator 318, 328, and 336.

The gantry system 340 includes a gantry carriage 342 and a gantry rail 44. The gantry carriage 342 includes two handles, each having a corresponding magnetic tip 346 at the end thereof. The magnetic tips 346 of the gantry carriage 342 are configured to magnetically attach to the magnetic tips 306 of the build platform 302. The gantry rail 344 is configured to move the build platform 302 including the printed object 304 between the linear actuators 318, 328, and 336.

The 3D printing device 300 further has a modular and expandable design scheme that allows additional modules (e.g., modules 370 and 380) to be added to the device 300. These additional modules may correspond to additional stages or may allow for additional printed objects to be printed over the existing printed object 204 or may allow for a new printed object to be printed on the build platform 202 (e.g., after removal of the existing/original printed object 204). Each of the additional modules 370 and 380 may include a respective linear actuator 372 and 382 and may further include a respective electromagnetic carriage 374 and 384 and a respective build platform detector 376 and 386.

Figure 4:
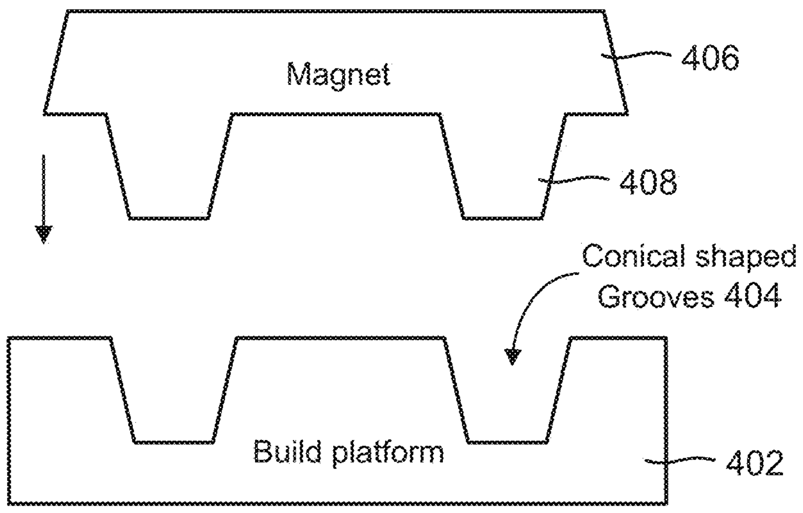
FIG. 4 is a diagram illustrating an example of a build platform of a 3D printing device according to some aspects.

FIG. 4 is a diagram illustrating an example of a build platform of a 3D printing device according to some aspects. The build platform 402 includes conical shaped grooves 404 corresponding to the section on the top surface of the build platform to which an electromagnetic carriage 406 magnetically attaches. The electromagnetic carriage 406 of each stage (e.g., printing, washing, and curing) includes a conical shaped protruding part 408 that fits into the grooves 404, thus ensuring that the electromagnets 408/410 are always properly attached to the linear actuator and that the build platform 402 is precisely aligned in the lateral directions without offsets. In addition, the conical shaped grooves 404 and protruding part 408 ensures the vertical alignment of the electromagnets 408/410 and the build platform 402. For example, when the build platform 402 is attached to the electromagnetic carriage 406 of the linear actuator during printing, the build platform 402 becomes aligned to the linear actuator using the canonical grooves 404 and consequently becomes aligned with the UV light engine. As a result, the success rate of the entire printing process can be increased and the errors can be decreased.

Figure 5:
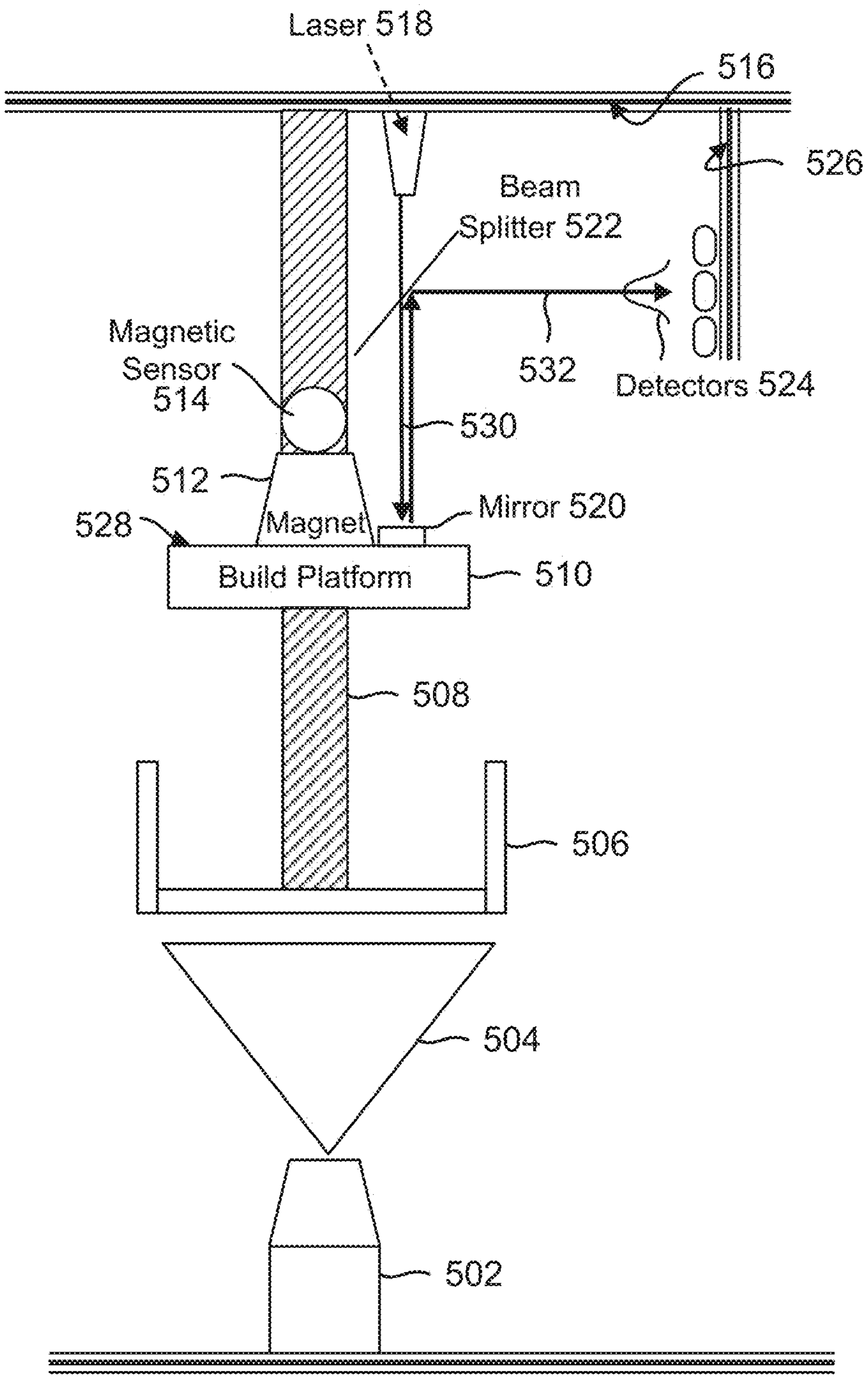
FIG. 5 is a diagram illustrating an example of alignment of the build platform according to some aspects.

FIG. 5 is a diagram illustrating an example of alignment of the build platform according to some aspects. In the example shown in FIG. 5, the printing module of the 3D printing device is shown including a UV light engine 502 configured to project a pattern 504, a resin tank 506 including a resin, and a linear actuator 508 configured to move a build platform 510 into and out of the resin tank 506. The build platform 510 is shown removably attached to an electromagnetic carriage 512 of the linear actuator 508. A magnetic sensor 514 of the linear actuator 508 is configured to detect when the electromagnetic carriage 512 is magnetically attached to the build platform 510.

To ensure that the build platform 510 is precisely horizontal so that the printed layers of the printed object are precisely horizontal, an alignment tool may be used to align the build platform 510 on the linear actuator 508 with the UV light engine 502. In the example shown in FIG. 5, the alignment tool includes a laser 518, a mirror 520, a beam splitter 522, and a detector/array of detectors 524. The mirror 520 is attached to a top surface 528 of the build platform 510, while the laser 518 is positioned on a horizontal fixed reference surface 516 inside the 3D printer. The detector/array of detectors 524 is/are positioned on a vertical fixed reference surface 526 inside the 3D printer. The beam splitter is positioned between the horizontal fixed reference surface 516 and the top surface 528 of the build platform 510 with an angle of 45° with respect to the horizontal fixed reference surface 516. The laser 518 is configured to produce collimated light 530, which propagates to the beam splitter 522, and then is transmitted through the beam splitter 522 and propagates to the mirror 520. If the build platform 510 is parallel to the horizontal (e.g., the horizontal fixed reference surface 516), the light incidence angle is zero and the light is reflected back in the opposite direction towards the beam splitter 522. The reflected light 532 is then reflected by the beam splitter 522 to the detector/array of detectors 524. The detected intensity is high at the middle detector. If a misalignment happened in the build platform 510, the light incidence angle on the mirror 520 is not zero and the reflected light 532 will not propagate back to the middle detector but be shifted to another detector or even far away from detectors. In this example, the detected intensity is low. Therefore, a system issue may be reported, and an alignment may be performed before starting the print process.

Another issue may involve the varying bad reflectivity of the mirror 520 due to poor handling of the mirror by user, exposure to resin, or alcohol in the washing module. This will affect the detected light intensity and vary from time to time. Thus, to avoid a measurement based on a reference value, an array of detectors 524 may be used. The detectors 524 may be placed very near to each other so that the gaussian beam from the laser 518, reflected from an aligned build platform 510, has a center peak intensity on the middle detector and its tail intensity is on the nearby detectors. If the ratio between the reading of middle detector to that of a nearby detector is high, the build platform 510 is aligned. However, if the build platform is not aligned, the beam may be be shifted upward or downward and the ratio may be low.

Figure 6:
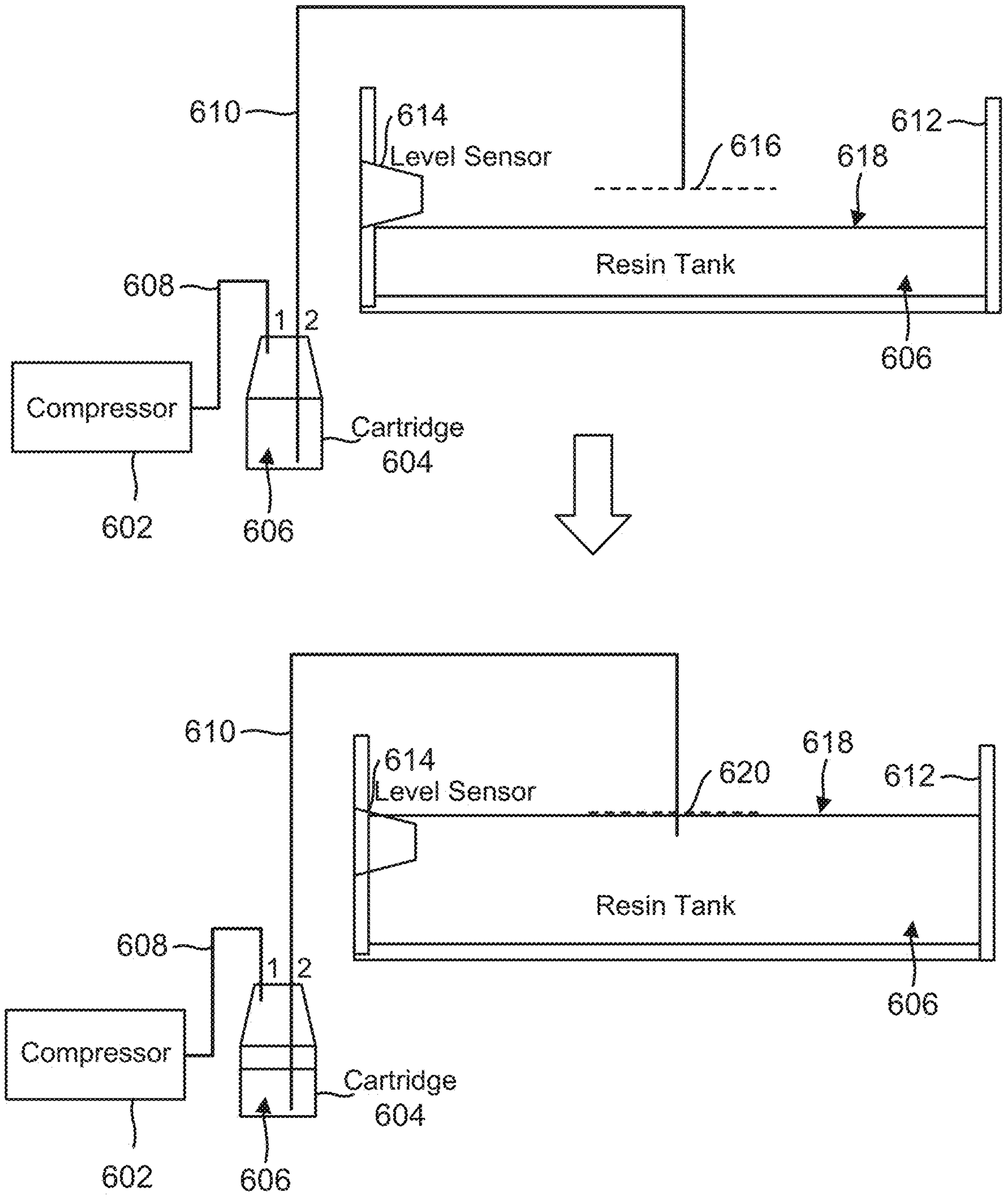
FIG. 6 is a diagram illustrating an example of a 3D printer automatic filling (auto-fill) system employing a level sensor according to some aspects.

FIG. 6 is a diagram illustrating an example of a 3D printer automatic filling (auto-fill) system employing a level sensor according to some aspects. To eliminate the need for any human intervention in refilling the resin tank after a certain number of printed objects, the 3D printing device can be equipped with an automatic filling system (auto-fill system). The auto-fill system includes a compressor 602, a resin cartridge 604 containing resin 606 and a level sensor 614. The compressor 602 is coupled to the resin cartridge 604 via a first tube (or hose) 608 and the resin cartridge 604 is coupled to a resin tank 612 via a second tube (or hose) 610. The compressor 602 pumps air into the resin cartridge 604 to cause resin 606 to flow from the resin cartridge 604 into the resin tank 612 to refill the resin tank 612. The level sensor 614 is configured to detect a resin level 618 of the resin 606 inside the resin tank 612. The auto-fill system is initiated when the level sensor 614 detects that the resin level 618 has fallen below a first threshold 616 (e.g., a pre-set threshold). The level sensor 614 is then configured to trigger the compressor 602 to pump the resin 606 from the resin cartridge 604 into the resin tank until the resin level 618 reaches a second threshold 620 corresponding to an appropriate amount of resin.

In some examples, this technique can be used to fill an empty resin tank 612 with resin 606. To accomplish this task, the compressor 602 may be initiated to allow the resin tank 612 to fill until the level sensor 614 indicates that the resin level 618 has reached the desired level (second threshold 620). At this point, the compressor 602 may automatically stop, thus ensuring that the resin level 618 does not exceed the desired level 620. Due to the complete absence of any human interaction with chemicals, the auto-fill system provides an extra level of safety to users.

Figure 7:
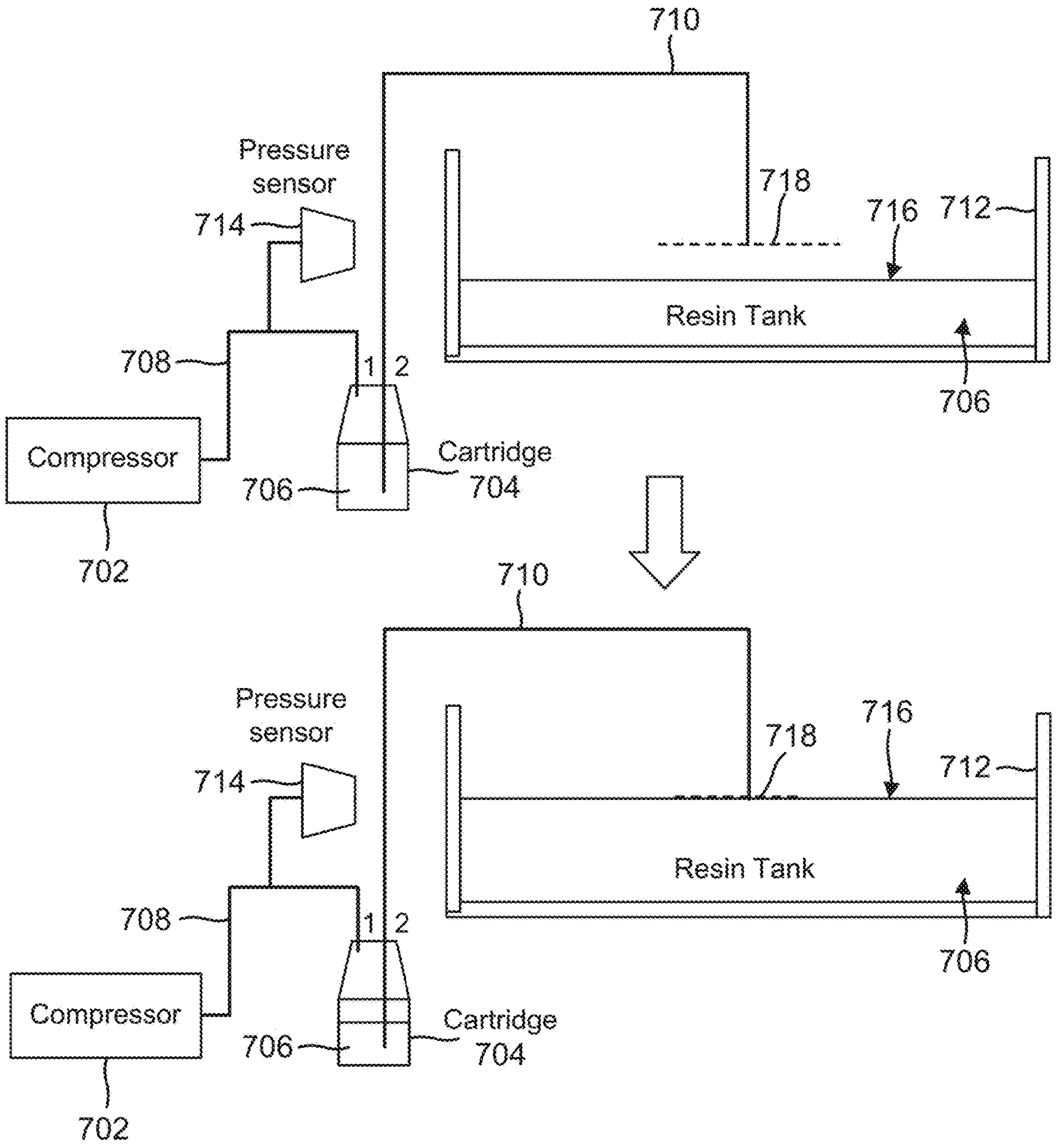
FIG. 7 is a diagram illustrating an example of a 3D printer auto-fill system employing pressure sensors according to some aspects.

FIG. 7 is a diagram illustrating an example of a 3D printer auto-fill system employing pressure sensors according to some aspects. The auto-fill system includes a compressor 702, a resin cartridge 704 containing resin 706 and a pressure sensor 714. The compressor 702 is coupled to the resin cartridge 704 via a first hose 708 and the resin cartridge 704 is coupled to a resin tank 712 via a second hose 710. The compressor 702 pumps air into the resin cartridge 704 to cause resin 706 to flow from the resin cartridge 704 into the resin tank 712 to refill the resin tank 712. The pressure sensor 714 is outside of the resin tank 712 to avoid any interaction between the resin 706 and the pressure sensor 714. The pressure sensor 714 is configured to measure a pressure value indicative of a resin level 716 inside the resin tank 712 with respect to a position 718 of the second hose 710 inside the resin tank 712.

In a first scenario, the resin cartridge 704 is full of resin 706. In this scenario, the compressor 702 begins to push the compressed air through the first hose 708, which is connected to the compressor 702 via, for example, a first hole in the resin cartridge 704. The pressure sensor 714 then reads a constant positive pressure value. The resin 706 then starts to move through the second hose 710 that is connected to the resin tank 712 through, for example, a second hole of the resin cartridge 704. The other tip of the second hose 710 at the resin tank is placed at a height equivalent to the target resin level 718. The compressed air exerts pressure on the second hose 710, causing the resin tank 712 to fill up from a current resin level 716. Once the resin 706 in the resin tank 712 reaches a specific level (e.g., after a calibrated amount of time) above the target resin level 718, an alert is triggered to begin suctioning the excess resin 706. This is performed by maintaining constant negative pressure readings from the pressure sensor 714 until the sensor 714 starts to produce fluctuating readings (due to the presence of air bubbles), indicating that the current resin level 716 of the resin 706 has reached the tip of the second hose 710 at the target resin level 718.

In another scenario, the amount of resin 706 inside the resin cartridge 704 is low and enough only to fill the resin tank 712 one time. In this scenario, the compressor 702 continuously pushes the compressed air through the first hose 708 and the pressure sensor 714 reads a constant positive pressure value. The resin 706 then starts to move to the resin tank 712 through the second hose 710. The current resin level 716 continues to rise in the resin tank 712 until the resin 706 in the resin cartridge 704 is empty. At this time, the reached level 716 may be just above the target resin level 718, but well below the previously mentioned calibrated level. Air bubbles in the resin tank 712 start to form and the pressure sensor 714 reading begins to fluctuate. The pressure sensor 714 may then issue an alert indicating that the cartridge 704 is low. Suctioning of the excess resin may continue until the resin 706 reaches the tip of the second hose 710 at the target level 718.

In another scenario, the amount of resin 706 inside the resin cartridge 704 is not enough to fill the resin tank 712 to the target level 718 even one time. In this scenario, the compressor 702 continuously pushes the compressed air, through the first opening of the resin cartridge 704. At the beginning, the pressure sensor 714 reads positive values. The resin 706 begins to flow through the second hose 710, which is connected to the resin tank 712 via the second hole of the resin cartridge 704. The compressed air causes the resin 706 to fill the resin tank 712 through the second hose 710. However, since the amount of resin 706 in the resin cartridge 704 is not enough, all resin 706 in the resin cartridge 704 goes into the resin tank 712 and the resulting actual resin level 716 reaches a level well below the target level 718. At this point, the pressure sensor 714 detects an atmospheric pressure reading and the pressure sensor 714 may issue an alert indicating that the resin cartridge 704 is empty.

Figure 8:
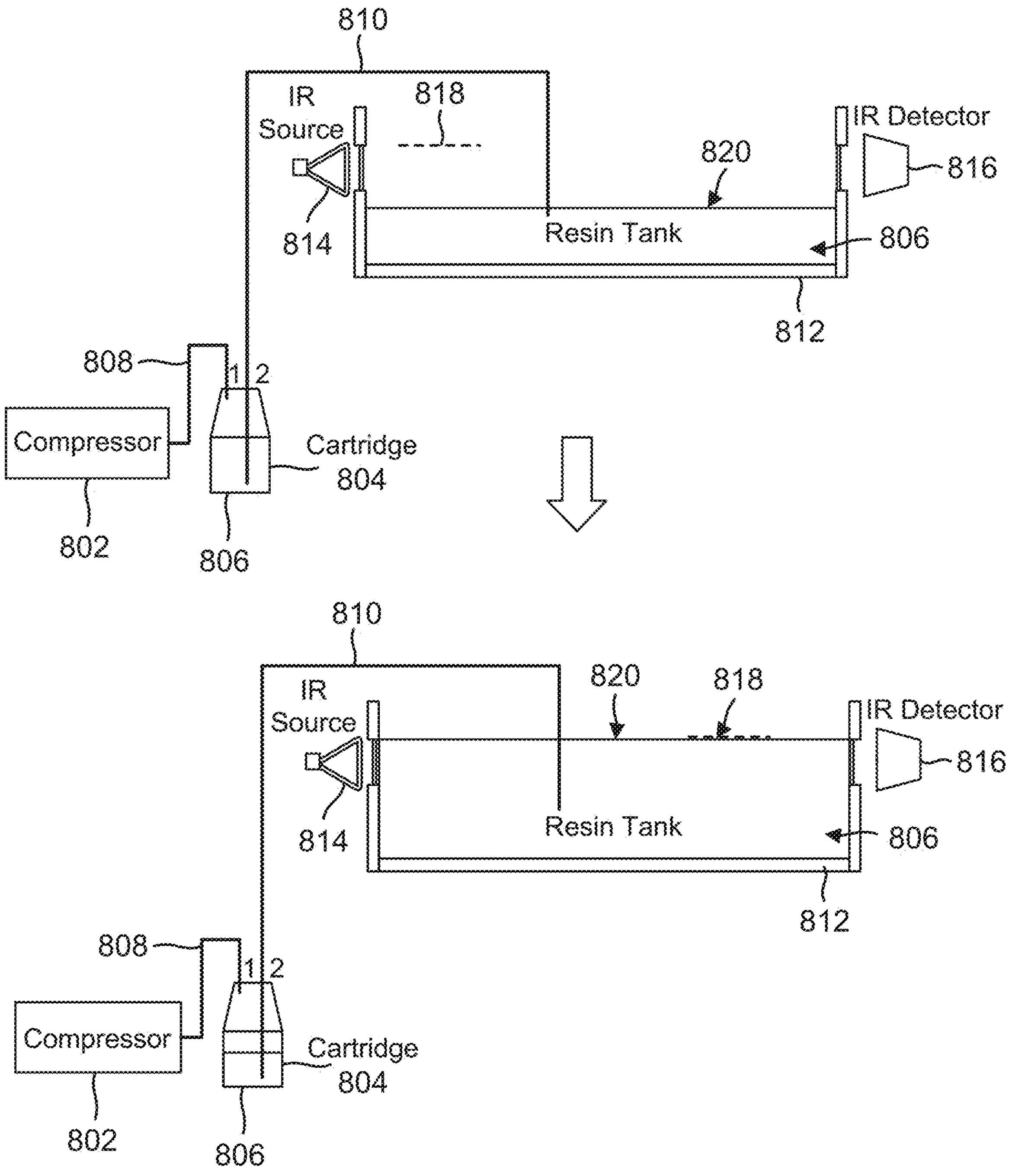
FIG. 8 is a diagram illustrating an example of a 3D printer auto-fill system employing an IR sensor according to some aspects.

FIG. 8 is a diagram illustrating an example of a 3D printer auto-fill system employing an IR sensor according to some aspects. The auto-fill system includes a compressor 802, a resin cartridge 804 containing resin 806 and an infrared sensor including an infrared source 814 (e.g., laser) and an infrared detector 816. The compressor 802 is coupled to the resin cartridge 804 via a first hose 808 and the resin cartridge 804 is coupled to a resin tank 812 via a second hose 810. The compressor 802 pumps air into the resin cartridge 804 to cause resin 806 to flow from the resin cartridge 804 into the resin tank 812 to refill the resin tank 812. The infrared sensor 814/816 is outside of the resin tank 812 to avoid any interaction between the resin 806 and the infrared sensor 814/816. The infrared sensor 814/816 is further positioned at a desired resin level 818 of the resin tank 812. For example, the infrared source 814 may be positioned on the left side of the resin tank 812 below the desired level 818 and the infrared detector 816 may be positioned on the right side of the resin tank 812 at the same level 818 as the infrared source 814.

The infrared sensor 814/816 is configured to measure an actual resin level 820 of the resin 806 inside the resin tank 812 and to trigger the compressor 802 to fill the resin tank 812 with resin 806 from the resin cartridge 804 until the actual resin level 820 reaches (or equals) the desired resin level 818. The wavelength of the infrared light is chosen to be aligned with the strong absorption peaks of water in the near infrared region. If the measured intensity is high, the actual resin level 820 is still below the desired level 818. However, if the light intensity is reduced, it implies that the water has absorbed the light, indicating that the actual resin level 820 is above the same level as the IR sensor 814/816. Upon filling to the desired level 818, and using, for example, a Schmitt trigger circuit, a signal may be sent to compressor 802 to stop filling the resin tank 812.

In any of the 3D printer auto-fill systems shown in FIGS. 6-8, a timer (not shown) may further be used to indicate if the resin cartridge is empty or not. For example, the timer may count the time of compressor operation. If the resin cartridge is empty, the compressor continues to work for a long time without receiving any trigger signal from the corresponding sensor. If the time exceeded a specified value, the resin cartridge is indicated to be empty and needs to be replaced.

In addition, in any of the previously described auto-fill systems, the auto-fill system may further be utilized to empty the resin tank. For example, the resin tank may need to be emptied in order to use a different type of resin. This can be achieved, for example, by tilting the resin tank and moving downward the second hose that connects the resin cartridge to the resin tank. This will draw out the remaining resin.

Furthermore, in some examples, the compressor shown in any of FIGS. 6-8 may be used to shake the resin inside the resin cartridge. Without a compressor, the user may need to remove the resin cartridge from the 3D printer and shake it. For example, if the resin tank is empty and the compressor starts to apply suction, air bubbles form inside the resin cartridge. These air bubbles act as if the user is shaking the resin inside the resin cartridge. The compressor thus avoids the need for human interaction to shake the resin.

Figure 9:
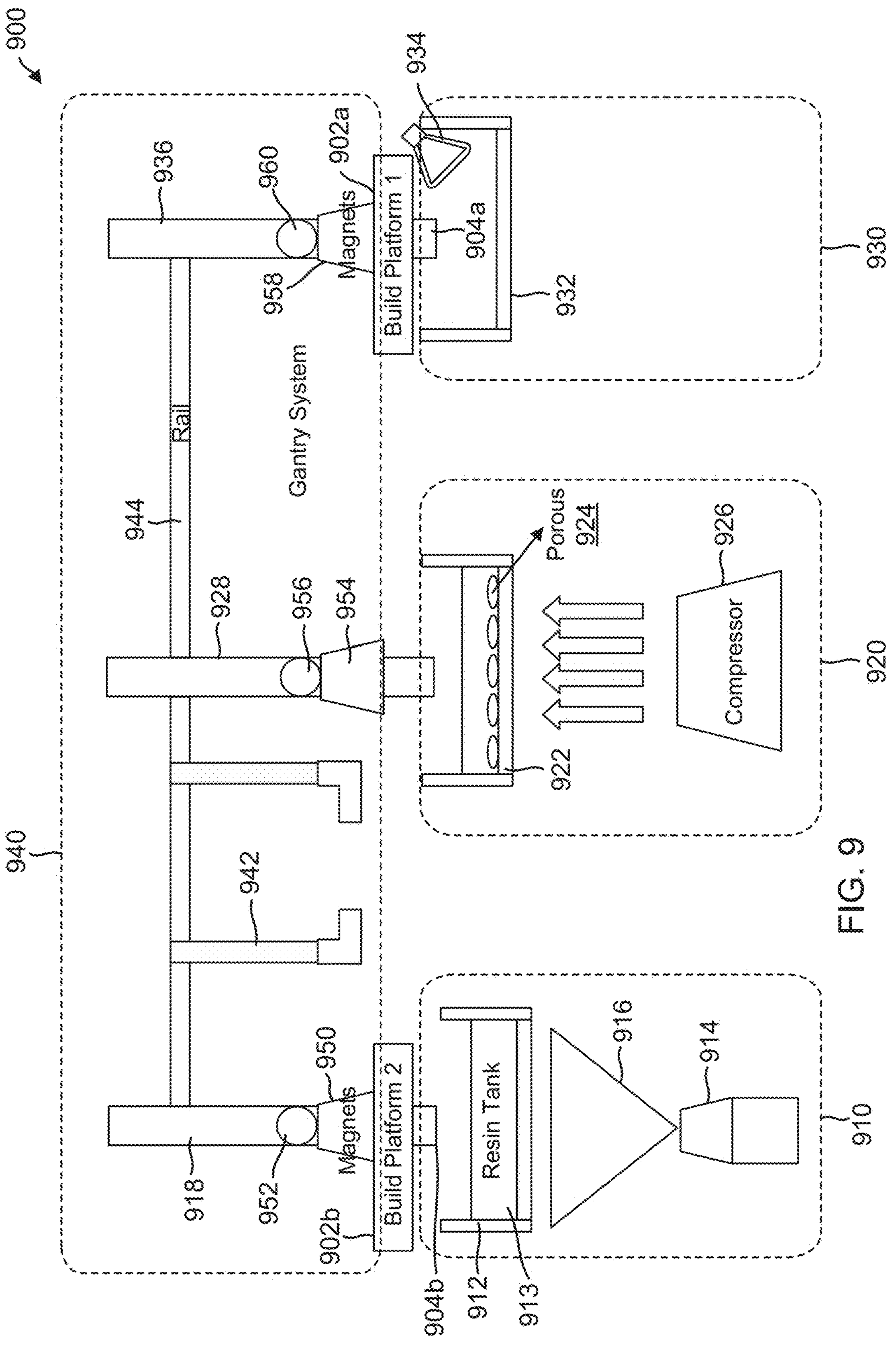
FIG. 9 is a diagram illustrating an example of printing parallelism according to some aspects.

FIG. 9 is a diagram illustrating an example of printing parallelism according to some aspects. To achieve printing parallelism, multiple build platforms 902*a* (Build Platform 1) and 902*b* (Build Platform 2) can be used simultaneously. Each build platform 902*a* and 902*b* may be configured to facilitate printing of a respective printed object 304*a* and 304*b* thereon.

As in the example shown in FIG. 1, the 3D printing device 900 shown in FIG. 9 includes a printing module 910, a washing module 920, a post curing module 930, and a gantry system 940 (e.g., a gantry automation system). The printing module 910 includes a resin tank 912 including a resin 919 (e.g., a photopolymer or light-activated resin). The printing module 910 further includes a UV light engine 914 configured to project a UV light pattern 916 corresponding to a layer of the printed object (e.g., printed object 904*b*) into the resin tank 312 to form the layer of the printed object 904*b*. The printing module 910 further includes a linear actuator 918 (e.g., a vertical axis rail) configured to move a build platform (e.g., build platform 902*b*) into and out of the resin tank 912. To secure the build platform 902*b* to the linear actuator 918, the linear actuator 918 can include an electromagnet carriage 950 configured to magnetically attach to an electromagnet on the build platform 902*b*.

The washing module 920 includes a washing solvent tank 922 including solvent, such as isopropyl alcohol or other suitable substance, configured to rinse the printed object (e.g., printed object 904*a* or 904*b*) to remove any excess resin. To improve and automate the washing process, the washing solvent tank 922 further includes a porous medium 924 (e.g., porous disks) positioned near the bottom of the washing solvent tank 922. A compressor 926 may be configured to pump air through the porous disks 924 to produce bubbles inside the washing solvent tank that are configured to rinse the printed object. The washing module 990 further includes a linear actuator 928 configured to move the build platform (e.g., build platform 902*a* or 902*b*) including the final printed object into and out of the washing solvent tank 922 to rinse the printed object. The linear actuator 928 further includes an electromagnetic carriage 954 configured to magnetically attach to the electromagnet on the build platform (e.g., 902*a* or 902*b*) to secure the build platform including the printed object to the linear actuator 928.

The post curing module 930 includes a curing tank 932 including a plurality of UV lights 934 (e.g., light-emitting diodes (LEDs)) configured to emit UV light to cure and further harden the printed object. The post curing module 930 may further include a linear actuator 936 configured to move the build platform (e.g. build platform 902*a*) including the final printed object (e.g., printed object 904*a*) into and out of the curing tank 932 to cure the printed object 904*a*. The linear actuator 936 further includes an electromagnetic carriage 958 configured to magnetically attach to the electromagnet on the build platform 902*a* to secure the build platform 902*a* including the printed object 904*a* to the linear actuator 936. Each of the electromagnetic carriages 950, 954, and 958 in each of the three stages (printing, washing, and post curing) may further include a respective build platform detector (e.g., platform detection sensor) 952, 956, and 960 configured to detect when the build platform (e.g., 902*a* or 902*b*) is attached to the respective electromagnetic carriage 950, 954, and 958 and thus to the respective linear actuator 918, 928, and 936.

The gantry system 940 includes a gantry carriage 942 and a gantry rail 944. The gantry carriage 942 includes magnetic tips configured to magnetically attach to corresponding magnetic tips (not shown) of the build platform 902*a* or 902*b*. The gantry rail 944 is configured to move the build platform 902*a* and/or 902*b* between the linear actuators 918, 928, and 936.

As shown in FIG. 9, the first build platform 902*a* goes through the printing process, starting with the printing stage (printing module 910). The gantry system 940 then moves the first build platform 902*a* including the printed object 904*a* from the printing stage (printing module 910) to the washing stage (washing module 920). After washing is completed, the gantry system 940 moves the first build platform 902*a* including the printed object 904*a* to the post curing stage (post curing module 930). Prior to moving the first build platform 902*a* to the post curing stage, the gantry system 940 moves the second build platform 902*b* to the printing stage to begin printing another printed object 904*b* simultaneously, and the printing process restarts, as previously explained. For example, the second build platform 902*b* may have just completed printing of a prior printed object and be positioned on the linear actuator 936. The gantry system 940 may then move the second build platform 902*b* to the printing stage (printing module 910) while the first build platform 902*a* is in the washing stage (washing module 920). The printing module 910 may then initiate printing of the printed object 904*b* on the second build platform 902*b* during washing or curing of the printed object 904*a* on the first build platform 902*a*.

Figure 10:
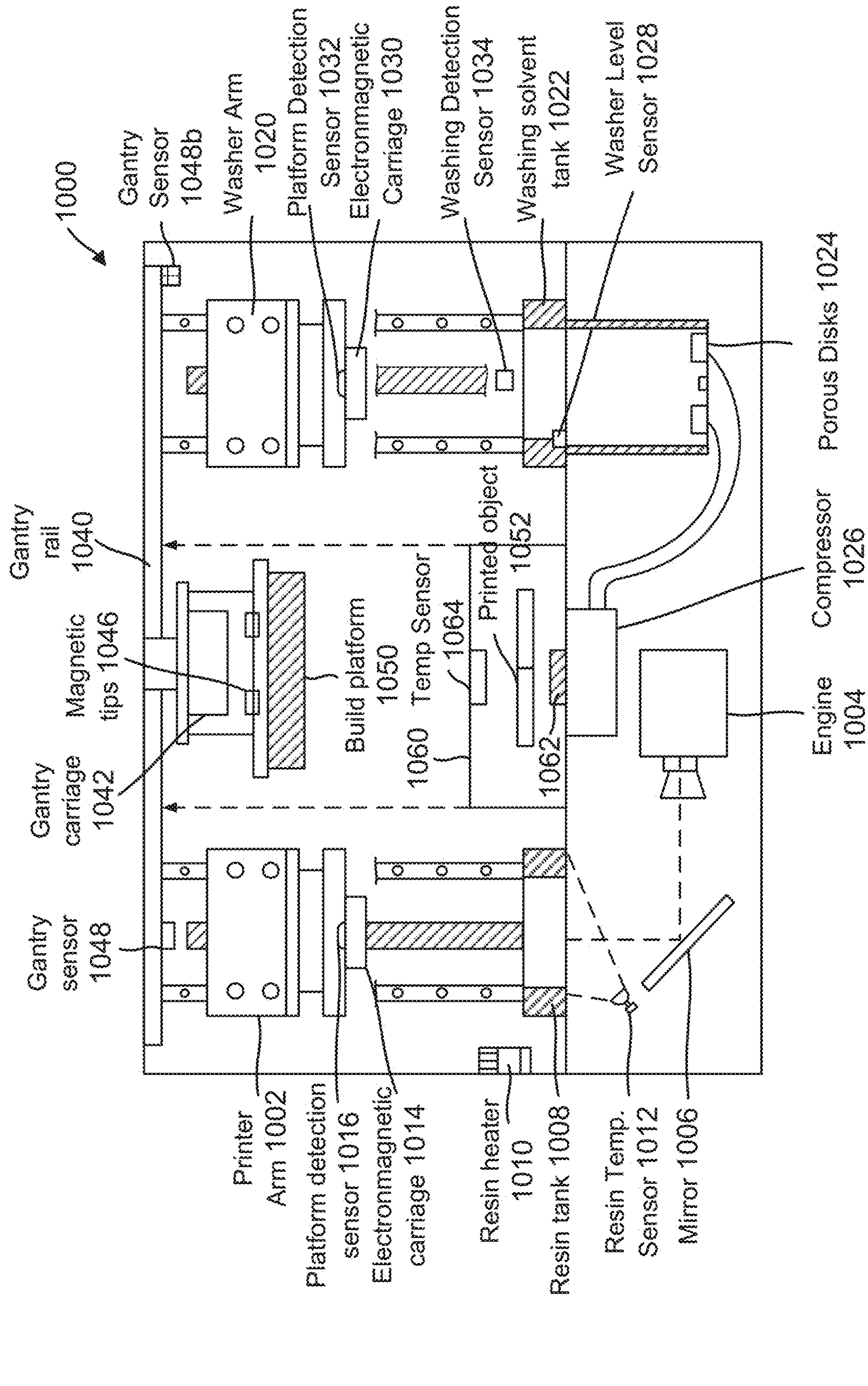
FIG. 10 is a diagram illustrating another example of a 3D printing device configured with a gantry system for automation according to some aspects.

FIG. 10 is a diagram illustrating another example of a 3D printing device configured with a gantry system for automation according to some aspects. The 3D printing device 1000 includes a printer arm 1002, a washer arm 1020, a post curing unit 1060, and a gantry system including a gantry rail 1040 and a gantry carriage 1042. The printer arm 1002 may correspond, for example, to a linear actuator configured to move a build platform 1050 into a resin tank 1008 for printing of a printed object 1052 thereon using a UV light engine 1004 and mirror 1006. The resin tank 1008 may include a resin heated to a desired temperature by a resin heater 1010. The washer arm 1020 may correspond, for example, to a linear actuator configured to move the build platform 1050 into a washing solvent tank 1022 to rinse the printed object 1052. For example, a compressor 1026 may be configured to pump air through porous disks 1024 in the washing solvent tank 1022 to produce bubbles inside the washing solvent tank that are configured to rinse the printed object 1052. The post curing unit 1060 includes a heater or UV light source 1062 configured to cure a printed object 1052 placed in the post curing unit 1060.

In an exemplary workflow, to initialize the 3D printing process, the gantry carriage 1042 holds the build platform 1050 using magnetic tips 1046 on the gantry carriage 1042 (and corresponding magnetic tips (not shown) on the build platform 1050) at the printing stage (e.g., adjacent the printer arm 1002). When a start printing command is received (e.g., entered by a user via a user interface, not shown), the 3D printing device 1000 checks to determine whether the build platform 1050 is at the printing stage. For example, a gantry system detector 1048*a* may be included on the gantry rail 1040 to detect whether the gantry carriage 1042 is positioned at the printer arm 1002. The 3D printing device 1000 may then verify the resin temperature in the resin tank using, for example, a resin temperature sensor 1012, to ensure that the resin temperature has reached the desired printing temperature. An electromagnet is then enabled to secure the build platform 1050 to the printer arm 1002. For example, an electromatic carriage 1014 on the printer arm 1002 may be turned on to magnetically attach to a corresponding electromagnet (not shown) on the build platform 1050. A platform detection sensor 1016 may further be used to detect when the build platform 1050 is secured (magnetically attached) to the printer arm 1002 (via the electromagnetic carriage 1014). The printer arm 1002 then moves the build plate 1050 into the resin tank 1008, stopping at the distance required for the first layer. Layer-by-layer, the printer arm 1002 moves the build platform 1050 up as each layer is printed.

Upon completion of the printed object 1052, the printer arm 1002 moves the build platform 1050 further up to catch the gantry carriage 1042. The electromagnet securing the build platform 1050 to the printer arm 1002 is then disabled to allow a smooth transition of the build platform 1050 from the printer arm 1002 to the gantry system. The 3D printing device 1000 can then verify that the build platform 1050 is now held by the gantry system using, for example, an additional sensor (not shown). The gantry rail 1040 then moves the gantry carriage 1042 carrying the build platform 1050 to the washer arm 1020. In addition, the washer arm 1020 moves up to a position where it can catch the build platform 1050 from the gantry carriage 1042. The 3D printing device 1000 can then detect the presence of the gantry carriage 1042 at the washing stage using another gantry sensor 1048*b*.

The washing process is then initiated. An electromagnet is enabled to secure the build platform 1050 to the washer arm 1020. For example, an electromatic carriage 1030 on the washer arm 1020 may be turned on to magnetically attach to a corresponding electromagnet (not shown) on the build platform 1050. A platform detection sensor 1032 may further be used to detect when the build platform 1050 is secured (magnetically attached) to the washer arm 1020 (via the electromagnetic carriage 1030). A washing level sensor 1028 may further verify that the solvent in the washing solvent tank 1022 is at the correct level. The washer arm 1020 may then move the build platform 1050 including the printed object into the washing solvent tank 1022. A washing detection sensor 1034 may be used to detect when the build platform 1050 descends to the washing solvent tank 1022.

Once the washing process is complete, a user may remove the printed object 1052 from the build platform 1050 (e.g., using a spatula or scrubber) and manually place the printed object 1052 in the post curing unit 1060. In some examples, upon detecting insertion of the printed object 1052, the post curing unit 1060 may automatically turn on the heater 1062 to cure the printed object 1052. In other examples, the user may turn on the heater 1062 after placing the printed object 1052 in the post curing unit 1060. A temperature sensor 1064 in the post curing unit 1060 may ensure that the post curing unit 1060 reaches a target temperature for curing of the printed object 1052. After curing, the user may remove the printed object 1052 from the post curing unit 1060.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A three-dimensional (3D) printing device, comprising:

a build platform;

a printing module configured to print a printed object on the build platform, the printing module comprising a resin tank and a first linear actuator configured to move the build platform in a linear motion into and out of the resin tank;

a washing module configured to rinse the printed object, the washing module comprising a washing solvent tank and a second linear actuator configured to move the printed object on the build platform in a linear motion into and out of the washing solvent tank; and a gantry system comprising a gantry rail and a gantry carriage, the gantry carriage configured to be removably attached to the build platform, the gantry rail configured to move the build platform comprising the printed object from the first linear actuator to the second linear actuator, wherein the build platform and the gantry carriage each comprise a magnet.

2. The 3D printing device of claim 1, further comprising:

a post curing module configured to cure the printed object.

3. The 3D printing device of claim 2, wherein the post curing module comprises a curing tank and a third linear actuator configured to move the printed object in a linear motion into and out of the curing tank, wherein the gantry rail is further configured to move the build platform comprising the printed object from the second linear actuator to the third linear actuator.

4. The 3D printing device of claim 2, further comprising:

an additional build platform, wherein the gantry system is configured to detach from the build platform and attach to the additional build platform to print an additional printed object on the additional build platform during washing or curing of the printed object.

5. The 3D printing device of claim 1, wherein the gantry carriage comprises a first set of magnetic tips and the build platform comprises a second set of magnetic tips, wherein the first set of magnetic tips are configured to magnetically attach to the second set of magnetic tips.

6. The 3D printing device of claim 1, further comprising:

electromagnets configured to magnetically attach the build platform to each of the first linear actuator and the second linear actuator.

7. The 3D printing device of claim 6, wherein:

the first linear actuator comprises a first electromagnet carriage configured to magnetically attach to the build platform to secure the build platform to the first linear actuator, wherein the gantry carriage is detached from the build platform upon attaching the build platform to the first linear actuator; and the second linear actuator comprises a second electromagnet carriage configured to magnetically attach to the build platform to secure the build platform to the second linear actuator, wherein the gantry carriage is detached from the build platform upon attaching the build platform to the first linear actuator.

8. The 3D printing device of claim 7, wherein the build platform comprises grooves configured to facilitate magnetic attachment to the electromagnetic carriage.

9. The 3D printing device of claim 6, further comprising:

magnetic field sensors configured to monitor a magnetic field strength of the electromagnets and to generate an alert in response to the magnetic field strength decreasing below a threshold.

10. The 3D printing device of claim 1, wherein the printing module further comprises:

an ultraviolet light engine configured to project a pattern into the resin tank to form the printed object on the build platform; and an alignment tool configured to align the build platform on the first linear actuator with the ultraviolet light engine.

11. The 3D printing device of claim 10, wherein the alignment tool comprises:

a laser configured to produce collimated light and positioned on a horizontal fixed reference surface inside the 3D printing device;

a mirror attached to a top surface of the build platform opposite the horizontal fixed reference surface;

a detector positioned on a vertical fixed reference surface inside the 3D printing device; and a beam splitter positioned between the horizontal fixed reference surface and the top surface and comprising a forty-five degree angle with respect to the horizontal fixed reference surface, wherein the collimated light from the laser propagates through the beam splitter to the mirror, reflected light from the mirror is reflected back to the beam splitter and further reflected by the beam splitter toward the detector.

12. The 3D printing device of claim 11, wherein the detector comprises an array of detectors.

13. The 3D printing device of claim 1, further comprising:

a first platform detection sensor on the first linear actuator configured to detect attachment of the build platform to the first linear actuator; and a second platform detection sensor on the second linear actuator configured to detect attachment of the build platform to the second linear actuator.

14. The 3D printing device of claim 1, further comprising:

a gantry system detection sensor configured to detect a position of the build platform with respect to the printing module and the washing module.

15. The 3D printing device of claim 1, further comprising:

an automatic filling system configured to automatically refill the resin tank, wherein the automatic filling system comprises a resin cartridge containing resin and a compressor.

16. The 3D printing device of claim 15, wherein the automatic filling system further comprises:

a level sensor inside the resin tank and configured to detect when a resin level in the resin tank falls below a first threshold, wherein the level sensor is further configured to trigger the compressor to pump the resin from the resin cartridge into the resin tank until the resin level reaches a second threshold.

17. The 3D printing device of claim 15, wherein the automatic filling system further comprises:

a pressure sensor outside the resin tank and coupled to a first hose between the compressor and the resin cartridge, wherein the resin cartridge and the resin tank are coupled via a second hose, wherein the pressure sensor is configured to measure a pressure value indicative of a resin level inside the resin tank with respect to a position of the second hose inside the resin tank.

18. The 3D printing device of claim 15, wherein the automatic filling system further comprises:

an infrared sensor outside the resin tank and positioned at a desired resin level of the resin tank, wherein the infrared sensor is configured to measure an actual resin level of the resin inside the resin tank and to trigger the compressor to fill the resin tank with the resin from the resin cartridge until the actual resin level equals the desired resin level.

19. The 3D printing device of claim 15, wherein the compressor is further configured to form air bubbles inside the resin cartridge to mix the resin inside the resin cartridge.

20. The 3D printing device of claim 1, wherein the washing module further comprises:

a porous medium inside the washing solvent tank; and a compressor configured to pump air through the porous medium to produce bubbles inside the washing solvent tank that are configured to rinse the printed object.

* * * * *